(12) United States Patent
Guschl et al.

(10) Patent No.: US 12,286,549 B2
(45) Date of Patent: Apr. 29, 2025

(54) SOLVENT-FREE FORMULATIONS AND NANOCOMPOSITES

(71) Applicant: PIXELLIGENT TECHNOLOGIES LLC, Baltimore, MD (US)

(72) Inventors: Peter Christopher Guschl, Baltimore, MD (US); James Dolgin, Baltimore, MD (US); Joseph Thomas Morgenstern, Baltimore, MD (US); Robert Swisher, Baltimore, MD (US)

(73) Assignee: PT SPE SUBCO LLC, Baltimore, MD (US)

( * ) Notice: Subject to any disclaimer, the term of this patent is extended or adjusted under 35 U.S.C. 154(b) by 566 days.

(21) Appl. No.: 17/294,238

(22) PCT Filed: Nov. 20, 2019

(86) PCT No.: PCT/US2019/062476
§ 371 (c)(1),
(2) Date: May 14, 2021

(87) PCT Pub. No.: WO2020/106884
PCT Pub. Date: May 28, 2020

(65) Prior Publication Data
US 2022/0002574 A1    Jan. 6, 2022

Related U.S. Application Data

(60) Provisional application No. 62/892,610, filed on Aug. 28, 2019, provisional application No. 62/769,696, filed on Nov. 20, 2018.

(51) Int. Cl.
| | | |
|---|---|---|
| C09D 133/06 | (2006.01) |
| B41M 3/00 | (2006.01) |
| B41M 5/00 | (2006.01) |
| B41M 7/00 | (2006.01) |
| C09D 4/06 | (2006.01) |
| C09D 7/40 | (2018.01) |
| C09D 7/45 | (2018.01) |
| C09D 7/62 | (2018.01) |
| C09D 7/63 | (2018.01) |
| C09D 11/037 | (2014.01) |
| C09D 11/101 | (2014.01) |
| C09D 11/107 | (2014.01) |
| C09D 11/322 | (2014.01) |
| C09D 11/38 | (2014.01) |
| C09D 133/14 | (2006.01) |

(52) U.S. Cl.
CPC ........ *C09D 133/062* (2013.01); *B41M 3/003* (2013.01); *B41M 5/0023* (2013.01); *B41M 7/0081* (2013.01); *C09D 4/06* (2013.01); *C09D 7/45* (2018.01); *C09D 7/62* (2018.01); *C09D 7/63* (2018.01); *C09D 7/67* (2018.01); *C09D 11/037* (2013.01); *C09D 11/101* (2013.01); *C09D 11/107* (2013.01); *C09D 11/322* (2013.01); *C09D 11/38* (2013.01); *C09D 133/14* (2013.01)

(58) Field of Classification Search
CPC ........ C09D 133/062; C09D 4/06; C09D 7/45; C09D 7/62; C09D 7/63; C09D 7/67; C09D 11/037; C09D 11/101; C09D 11/107; C09D 11/322; C09D 11/38; C09D 133/14; C09D 4/00; B41M 3/003; B41M 5/0023; B41M 7/0081; C08F 292/00; C08F 2/50; C08F 220/18; C08F 220/26; C08K 5/0025; C08K 2201/003; C08K 5/00; C08K 9/04; C08K 220/26; C08K 3/22; C08K 5/0041; C08K 9/06; C08L 101/02

See application file for complete search history.

(56) References Cited

U.S. PATENT DOCUMENTS

| | | | |
|---|---|---|---|
| 7,264,872 B2 | 9/2007 | Walker et al. |
| 10,033,014 B2 | 7/2018 | Chen et al. |
| 10,988,598 B2 | 4/2021 | Bai et al. |
| 2012/0088845 A1 | 4/2012 | Gonen Williams et al. |
| 2013/0207053 A1 | 8/2013 | Gonen Williams et al. |
| 2013/0221279 A1 | 8/2013 | Xu et al. |
| 2014/0216649 A1 | 8/2014 | Woods et al. |
| 2014/0322549 A1 | 10/2014 | Xu et al. |
| 2015/0203709 A1 | 7/2015 | Cooper et al. |
| 2018/0112069 A1 | 4/2018 | Bai et al. |

FOREIGN PATENT DOCUMENTS

| | | |
|---|---|---|
| CN | 101124273 | 2/2008 |
| CN | 102947218 | 2/2013 |
| CN | 103328374 | 9/2013 |
| CN | 105531824 | 4/2016 |
| CN | 107849255 | 3/2018 |

(Continued)

OTHER PUBLICATIONS

International Search Report for PCT/US2019/062476 dated Mar. 18, 2020, 5 pages.
Written Opinion of the ISA for PCT/US2019/062476 dated Mar. 18, 2020, 6 pages.
Third Party Observation for application No. JP2021-527927, submitted Sep. 5, 2024, 16 pages.
Third Party Observation for application No. JP2021-527927, submitted Oct. 3, 2024, 24 pages.

*Primary Examiner* — Jessica M Roswell
(74) *Attorney, Agent, or Firm* — NIXON & VANDERHYE, PC

(57) ABSTRACT

The present disclosure provides a high-refractive index acrylic formulation embedded with sub-30 nm metal oxide nanocrystals. The formulation is solvent-free, low-viscosity, injectable (among other film deposition techniques) and produces high-refractive index, high transparency nanocomposites for a variety of optical applications including OLED lighting and display applications.

23 Claims, 10 Drawing Sheets

(56) References Cited

FOREIGN PATENT DOCUMENTS

| | | |
|---|---|---|
| JP | 2007177194 | 7/2007 |
| JP | 2009102550 | 5/2009 |
| JP | 2009102628 | 5/2009 |
| JP | 2010122462 | 6/2010 |
| JP | 2011012163 | 1/2011 |
| JP | 2011516668 | 5/2011 |
| JP | 2012184349 | 9/2012 |
| JP | 2017095556 | 6/2017 |
| JP | 2018027883 | 2/2018 |
| JP | 2018511680 | 4/2018 |
| JP | 2018132586 | 8/2018 |
| WO | 2014163100 | 10/2014 |
| WO | 2016160806 | 10/2016 |
| WO | 2017136711 | 8/2017 |
| WO | 2018/015283 | 1/2018 |

SOLVENT-FREE FORMULATIONS AND NANOCOMPOSITES

This application is the U.S. national phase of International Application No. PCT/US2019/062476 filed Nov. 20, 2019 which designated the U.S. and claims priority to U.S. Provisional Patent Application Nos. 62/769,696 filed Nov. 20, 2018, and 62/892,610 filed Aug. 28, 2019, the entire contents of each of which are hereby incorporated by reference.

BACKGROUND

Solvent-free polymeric nanocomposite formulations described herein exhibit low viscosity, high refractive index and high optical transmittance in the visible spectrum. The materials of the present disclosure are easily coated onto the surface of desired substrates via common solution coating processes, such as by inkjet printing, spin coating, screen printing, dip, dispense, roll-to-roll, slot die, draw bar, or spray coating for many electronic applications. The nanocomposites of the present disclosure are unique in providing high refractive index and high transparency films or coatings or layers which are desirable in electronics applications, such as organic light emitting diode (OLED) applications where these properties are important to the performance. The thickness of coatings described herein may range from tens of nanometers to millimeters, as may be required for specific applications.

OLEDs can be distinguished as bottom-emission or top-emission based on the direction of the light output. Bottom-emission OLEDs are used in large-sized panels such as TVs, and top-emission OLEDs are used for small mobile applications. In top-emission, the OLED device consists of a reflective layer, ITO anode, hole injection layer (HIL), hole transport layer (HTL), emission layer (EML), electron transport layer (ETL), electron injection layer (EIL), semi-transparent metal cathode and capping layer on a thin film transistor structure. Light generated from the emission region passes through a semi-transparent metal cathode. Only a small amount (~25%) of the light generated can be extracted from an OLED device, because light can be trapped in a waveguide and surface plasmon mode within the stack. In addition, some of the light is back-reflected to the device though thin-film encapsulation layers because of index mismatching between the layers. In order to achieve improved light efficiency from the structure, high refractive index (HRI) layers are needed to eliminate the waveguide trap mode between inorganic passivation layer or between thin-film encapsulation and other layers. The waveguide trap mode can only be solved by using an index-matching, HRI layer. A high-refractive index, high-transparency coating, with a refractive index around 1.7 or higher, as may be produced with a material of the present disclosure, dramatically enhances the efficacy of the OLED lighting and display devices including same.

Inkjet printing is a key process for manufacturing OLED devices, including depositing high-reliability organic passivation layers and planarization layers. Inkjet printing is also more cost-effective and enables vacuum-free processes. Inkjet printers effectively deposit the intended ink formulations onto a variety of substrate, demonstrating efficient material transfer with little to no waste. Also, inkjet printing allows for fast deposition of simple films of specific thicknesses or more complex patterns required for given applications.

Formulation viscosity is one of the key parameters for determining applicability to inkjet printing. For instance, inkjet printing typically requires 5-20 cP values at 25 C. Higher viscosities are allowable when printhead heating is utilized. Depending on the heating capability of the printhead, 25 C viscosities could be as high as 100 cP to reduce viscosity to within the 5-20 cP range at elevated temperatures around 60-100 C. By bringing down the formulation viscosity to this narrow range, important monomer, oligomer and polymer selections and nanoparticle weight loadings must be made. Low-viscosity matrix materials with sufficiently-high refractive indices allow for enough nanoparticle loadings to reach the desired final film refractive index. It is often a challenge to find monomers, oligomers and polymers with low viscosity and high refractive index, because these properties typically increase together.

In addition to formulation viscosity an ink must have a surface tension that is appropriate for stable drop ejection as well as sufficient wettability on desired substrates. A typical range of surface tension for inkjet printing are 20-35 dyne/cm and depends on other fluid properties such as viscosity and density and inkjet parameters such as drop volume and drop velocity. When a drop is ejected from the nozzle, a ligament or tail appears and contracts to form a spherical drop. If the ligament does not contract quickly enough or is too long, then small satellites can form and cause difficulties with printed films. Stable and consistent ejection of drop with no tails or satellites is important for optimal jetting performance and print uniformity. Additionally, inks should be stable over long periods of time for manufacturability. Shelf life, time prior to use, should be many months, and pot life, time during use, and jetting stabilities should cover a day or more.

Other deposition techniques, such as slot-die coating or spin-coating or drawdown or screen-printing films, dispensing lenses and others are applicable for the disclosed formulations described herein. Higher viscosity formulations with high loadings of nanoparticles and likely high-viscosity components (e.g. crosslinkers, oligomers and polymers), and high-refractive index values, in addition to other physical properties, could be achieved. A relevant range of viscosity for these different deposition techniques could range from 5-12,000 cP or greater than 12,000 cP.

Although solvent-free formulations are preferred for the presently disclosed formulation, a small amount of solvent is allowable for maintaining lower viscosities specific to inkjet printing. Formulations can be either "solvent-free" or "solvent-less" under the disclosed invention. "Solvent-free" formulations contain less than 5 wt % solvent, or between 0 and 5 wt % solvent, preferably 0 and 1 wt % solvent regarding the total formulation. "Solvent-less" formulations contain between 5 and 20 wt % solvent regarding the total formulation.

Solvent-free formulations are most desirable for OLED applications due to the requirement to minimize outgassing of organic species from the cured layer. The outgassing of volatile organics could cause problems within the multilayered structure of OLED display devices, leading to device failures with time during processing steps (e.g. indium-tin oxide or ITO deposition) or device operation. Traditionally, solvent-containing materials have been used to deposit polymer films by using solution process such as inkjet printing, spin coating, screen printing, dip, dispense, roll-to-roll, slot die, draw bar, or spray coating. In electronic devices including OLEDs, solvent-containing materials have been used for electrical and optical component as well. However, these solvent-containing materials negatively affect the performance and process of the device despite thermal treatment to eliminate solvents after deposition. One of the major degradation issues in organic devices is residual solvent in the coated film which degrades device efficiency and lifetime. Solvent-free solution processable materials are being developed to alleviate this and other problems and to eliminate expensive or time-consuming processes such as vacuum chamber drying. Additionally, solvent-free formulations would require fewer processing steps (pre-baking or post-baking) of the cured films to be performed prior to deposition of the next layer in the device. Ideally, solvent-free, UV-curable formulations would allow for fast, simple film curing after deposition.

The refractive index of the solvent-free formulation is designed to match or closely match the refractive indices of the adjacent layers. Values of refractive index of the nanocomposite layer are preferably 1.6-2.0 to correspond with the refractive indices of inorganic layers such as ITO and silicon nitride (1.8-2.1) in the visible wavelengths. Nanocrystals of high-refractive index inorganic oxides such as zirconium oxide, titanium oxide, hafnium oxide, zinc oxide, tantalum oxide and niobium oxide can achieve values in this specified range. When synthesized to less than 40 nm and capped with appropriate capping agents for dispersibility, capped metal oxides be dispersed in appropriate monomers, oligomers and polymers, at weight loadings of 35-90% and can yield stable dispersions that can make films with refractive index values ranging from 1.6-2.0 over the visible light spectrum. Inorganic oxides with lower indices of refraction, such as silicon dioxide and germanium oxide, would either not be able to achieve values in the desired range or would require very high weight loadings to reach the final desired high refractive index values. Higher weight loadings of nanoparticles typically give rise to very high viscosities that eliminate certain formulations for specific deposition processes such as inkjet printing.

Nanocomposite formulations intended for applications as a high refractive index material or an index matching material in smart windows, sensors, CMOS sensors, LED, mini-LED, micro-LED, organic LED (OLED), Quantum LED (QLED), touch screen, display, flexible electronics, printed electronics, self-cleaning surfaces, Augmented Reality (AR), Mixed Reality (MR), and Virtual Reality (VR), wave guides, light extraction, and 3D sensors. Formulation and film transparencies are strongly related to the nanoparticle size and distribution. By synthesizing and maintaining particle sizes of 40 nm or less, the formulation and films can allow high transmission of light (>95%) over the visible spectrum. Particles that are greater than 40 nm tend to scatter light unfavorably, causing overall lower transmissions through the materials. Aggregated particles can also give rise to this scattering issue if dispersions are not stable over time. Unstable dispersions likely have particles that are not capped appropriately with enough or the right capping agents for the intended organic matrix. In addition, having a small particle size narrow size distribution and no aggregates in a formulation allows for high nanocrystal loading without significantly increasing the viscosity, resulting in high refractive index, high transparency, low viscosity formulations.

Finally, high-RI ink formulations invented for the purpose of inkjet-printing must have stable jetting over long periods of time for application of high manufacturability. Components within the ink require a low degree of volatility such that residual material in the inkjet nozzles does not increase significantly in viscosity. This could lead to clogging of the nozzles and printed film defects, such as, streaks and pinholes. Inks that possess this issue would require constant use of the printhead or frequent purging in order to prevent clogging. Industry requires interim periods of time in which non-jetting occurs that ranges from many minutes to hours or even days in extreme cases.

DESCRIPTION

The present disclosure provides a solvent-free, low-viscosity, high-refractive index, UV-curable formulation comprising capped metal oxide nanocrystals in an organic matrix with curing agent. Said formulations additionally comprise any of the following components: a wetting agent, an antioxidant, an adhesion promoter, a leveling agent, a dispersing agent, a plasticizer, a toughener, a thickener, a thinner, a dispersant, or a flexibilizer, or an organic dopant, or other functional additives. These formulations result in high-refractive, high-transparency nanocomposites.

The present disclosure provides the following non-limiting numbered embodiments as further examples of the disclosed technology:

1. A formulation comprising a dispersion of at least partially capped metal oxide nanocrystals and a matrix comprising at least one of a monomer, oligomer or a polymer, optionally further comprising a curing agent, a surfactant, a wetting agent, an antioxidant, an adhesion promoter, a leveling agent, a dispersing agent, a plasticizer, a toughener, a thickener, a thinner, a dispersant, or a flexibilizer, or an organic dopant, or other functional additives.
2. The formulation of embodiment 1 wherein the matrix comprising one or more of acrylate and/or methacrylate monomers, reactive diluents, a curing agent and, optionally, at least one a surfactant or a wetting agent.
3. The formulation of embodiments 1-2 wherein said metal oxide nanocrystals are zirconium oxide, titanium oxide, hafnium oxide, zinc oxide, tantalum oxide, niobium oxide, or a mixture of at least two of said oxides.
4. The formulation of any one of embodiments 1-2 wherein the average particle diameter of the at least partially capped nanocrystals is in the range from 1-30 nm, preferably less than 20 nm as measured by DLS or TEM.
5. The formulation of embodiments 1~4 wherein said nanocrystals are at least partially capped with at least one capping agent selected from the group consisting of methyltrimethoxysilane, n-propyltrimethoxysilane, n-propyltriethoxysilane, n-octyltrimethoxysilane, n-octyltriethoxysilane, phenytrimethoxysilane, dodecyltrimethoxysilane, m,p-ethylphenethyl trimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy)propyltrimethoxysilane, 3-(acryloyloxy)propyl trimethoxysilane, 3-isocyanatopropyltriethoxysilane, 3-isocyanatopropyltrimethoxysilane, and glycidoxypropyltrimethoxysilane, vinyltrimethoxysilane, allyltrimethoxysilane, 1-hexenyltrimethoxysilane, 1-octenyltrimethoxysilane, heptanol, hexanol, octanol, benzyl alcohol, phenol, ethanol, propanol, butanol, oleylalcohol, dodecylalcohol, octadecanol and triethylene glycol monomethyl ether, octanoic acid, acetic acid, propionic acid, 2-[2-(2-methoxyethoxy)ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(Methacryloyloxy)ethyl succinate, or any combination thereof 6. The formulations of embodiments 1-5 include weight loadings of the metal oxide nanocrystals ranging from 20 to 80 wt % of the formulation.
7. The formulation of embodiments 1-6 wherein said metal oxide nanocrystals are at least partially capped and the formulation further comprising monofunctional acrylate and/or methacrylate monomers with high refractive index, such as, benzyl (meth)acrylate (BA and BMA), ethylene glycol phenyl ether (meth)acrylate (PEA and PEMA), 2-hydroxy-3-phenoxypropyl (meth) acrylate (HPPA and HPPMA), 2-phenoxy benzyl acrylate (PBA), biphenyl methacrylate (BPMA), 2-phenylphenol methacrylate (PPMA), isobutyl acrylate (IBA), 2-phenylethyl acrylate (2-PEA), 2-(phenylthio) ethyl acrylate (PTEA), or combinations thereof
8. The formulation of embodiments 1-7 wherein metal oxide nanocrystals is at least partially capped and the formulation further comprising di-, tri-, tetra- and penta-functional acrylate and/or methacylate monomers, such as, 1,6-hexanediol di(meth)acrylate (HDDA and HDDMA), di(ethyleneglycol) di(meth)acrylate (DEGDA and DEGDMA), ethylene glycol diacrylate, glycerol 1,3-diglycerolate diacrylate, tri(propylene glycol) diacrylate, trimethylolpropane tri(meth)acrylate (TMPTA and TMPTMA), trimethylolpropane ethoxylate tri(meth)acrylate (EOTMPTA and EOTMPTMA), 1,6-hexanediol ethoxylate diacrylate, pentaerythritol tetraacrylate (PETA), and dipentaerythritol penta-/hexa-acrylate (DPHA).
9. The formulation of embodiments 1-8 wherein metal oxide nanocrystals is at least partially capped and the formulation further comprising reactive diluents, such as, 1-vinyl-2-pyrrolidone (NVP), N-vinyl caprolactam, 2-(2-vinyloxyethoxy) ethyl (meth)acrylate, isobutyl acrylate, styrene (STY), 4-methylstyrene (4MS), 4-vinylanisole (4VA) and divinylbenzene (DVB). For example, 1-vinyl-2-pyrrolidone is added to the formulation of embodiments 1-8 to improve surface cure or tack. The weight percent of the reactive diluent is 10-80 wt % with respect to the total monomer content. The preferred weight percent of the reactive diluent is 25-70 wt % with respect to the total monomer content.
10. The formulation of embodiments 1-9 wherein metal oxide nanocrystals is at least partially capped and the formulation further comprising di-, tri-, tetra-functional thiol crosslinkers, such as, trimethylolpropane tris(3-mercaptopropionate).
11. The formulation of embodiments 1-10 wherein metal oxide nanocrystals is at least partially capped and the formulation further comprising sulfur-containing commercial resins and adhesives such as #18109, #18165 and #6205 (NTT-AT); and LumipluS LP-1100, LPB-1102, LPJ-1102 and LPS-1130 (Mitsubishi Gas Chemical Company)
12. The formulation of embodiments 1-11 wherein metal oxide nanocrystals is at least partially capped and the formulation further comprising reactive organic dopants, such as, phenanthrene (PhA) or 9-vinylcarbazole (NVCb). Concentrations of organic dopants ranges from 1 to 50 wt %.
13. The formulation of embodiments 1-12 wherein metal oxide nanocrystals is at least partially capped and the formulation further comprising surfactants or a combination of surfactants, such as, polyether-modified siloxanes, fluoro-surfactants, that are either non-reactive or reactive in the acrylate monomer system. Concentrations of said surfactants within the total formulation is in the range from 0.1-2.0 wt %. Preferred concentrations of said surfactants is in the range from 0.5-1.0 wt %.
14. The formulation of embodiments 1-13 wherein metal oxide nanocrystals is at least partially capped and the formulation optionally further comprising scattering particles, such as, titanium dioxide, aluminum oxide, silicon dioxide, and low- and or high-index polymer particles. Scatterer particles sizes ranges from 100-400 nm. Concentrations of said scatterers within the total formulation ranges from 0.1-30.0 wt %. Preferred concentrations of said scatterers ranges from 0.5-17.0 wt %.
15. The formulation of embodiments 1-14 further comprising curing agents or photoinitiators, such as, Irgacure 184, Irgacure 819, TPO, Ebercryl P39, and Ebercryl P115. Concentrations of said photoinitiator within the total formulation is in the range from 0.1-20 wt % with respect to the monomer content. Preferred concentrations of said photoinitiators is in the range from 1.0-4.0 wt % with respect to the monomer content.
16. The formulation of one of embodiments 1-15 wherein said dispersion does not contain benzyl methacrylate (BMA) or trimethylpropane triacrylate (TMPTA).
17. The formulations of embodiments 1-16 where in the formulation is solvent-less or solvent-free.
18. The solvent-free and/or solvent-less formulation of embodiment 17 wherein the viscosity of the formulation is within the range of 5-100 cP, when measured at 25° C. with a Brookfield RVDV II+ cone and plate viscometer. Preferred viscosities for inkjet-printing at 25° C. are 5-20 cP. When cartridge heating is applicable, viscosities at 25° C. are 15-100 cP for cartridge temperatures between 35-100° C. Alternatively, the viscosity of the formulation is 5 cP-10 cP, or 10 cP-15 cP, 15 cP-20 cP, 20 cP-30 cPs, 30 cP-50 cP, or 50 cP-100 cP, when measured at 25° C. For deposition methods other than inkjet-printing viscosities ranges from 100 cP-1,000 cP, 1,000 cP-5,000 cP and 5,000 cP-12,000 cP.
19. The solvent-free and/or solvent-less formulation of any of the embodiments 17-18 wherein the nanocrystal loading is 35-40%, 40-45%, 45-50%, 50-55%, 55-60%, 60-65% and 65-70% by weight.
20. The solvent-free and/or solvent-less formulation of any of the embodiments 17-19 wherein the refractive index is 1.52-1.56, 1.56-1.58, 1.58-1.60, 1.60-1.62, or 1.62-1.64, 1.64-1.66, or 1.66-1.68, or 1.68-1.70, or 1.70-1.72, or 1.72-1.74, or 1.76-1.78, or 1.78-1.80 or 1.80-1.82, or 1.82-1.84, or 1.84-1.86, or 1.86-1.88, or 1.88-1.90, or 1.90-1.92, or 1.92-1.94 at 589 nm as measured by an Abbe refractometer.
21. The solvent-free and/or solvent-less formulation of any of the embodiments 17-20 wherein the surface tension of the formulation is within the range of 20-25 dyne/cm, 25-30 dyne/cm, 30-35 dyne/cm and 35-40 dyne/cm, when measured at 25° C. with a Rame-Hart surface tensiometer.
22. The solvent free and/or solvent-less formulation of any of the embodiments 17-21 wherein the % T of the formulation is 99%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10% in the visible wavelengths (400-700 nm).

23. The formulation of embodiments 1-22 wherein the formulation polarity is at least 4.0-8.0% to ensure little to no nozzle plate wetting of the inkjet printhead with an appropriate surfactant or surfactants at high enough concentrations. Similar observations on minimum polarity values for good inkjet quality was referenced in UK patent GB 2517592 A (Sericol Ltd, A. Runacre, M. Pemble, G. Osborne, 25.02.2015). The polarity is defined to be the ratio of the polar component of the surface tension divided by the total surface tension of the formulation. The polar component of the surface tension is determined through measurement of contact angle on a Teflon substrate and surface tension of the formulation with a Rame-Hart goniometer and surface tensiometer under the Owens, Wendt, Rabel and Kaelble method (REF: https://www.kruss-scientific-.com/services/education-theory/glossary/owens-wendt-rabel-and-kaelble-owrk-method/). Table 1 displays measured values of contact angles on a Teflon substrate, surface tension and polarity for various monomers and formulations.

24. The formulations of embodiments 1-23 are inkjet-printable in that droplets can be ejected from printhead types such as Dimatix DMC, Fujifilm SG1024/MA, Konica Minolta KM1024i with droplet volumes between 6-40 pL at drop velocities from 3-9 m/s. Applications of inkjet-printable formulations such as the ones described in this invention comprise blanket films, specific patterns and lenses from micron to millimeter sizes.

25. The formulations of embodiments 1-24 are deposited into films via spin coating, slot-die coating, screen-printing, ink-jet printing, nanoimprinting, photopatterning, 3D printing, dip coating, draw-bar coating, roll-to-roll printing, spray coating, dispensing, volume casting, screen printing and any combination thereof.

28. A nanocomposite of any of the embodiments 26-27 wherein the film of at least 1 μm has a surface roughness of 5-4 nm, or 4-3 nm, or 3-2 nm, or 2-1 nm, or 1-0.5 nm, or 0.5-0.1 nm.

29. A nanocomposite of any of the embodiments 26-28 wherein the coating or film possesses high film uniformity (or low film non-uniformity) from edge to center. Film non-uniformity is defined as:

$$\% \ NU = \frac{T_{MAX} - T_{MIN}}{2T_{AVG}} \times 100\%$$

where % NU is the non-uniformity of a film's thickness, and $T_{MAX}$, $T_{MIN}$ and $T_{AVG}$ are the maximum measured thickness, minimum measured thickness and average thickness of a film, respectively. % NU values range from 3-20%. Preferred % NU values are 5-10%.

30. Applying the formulations of 1-25 onto an optically transparent hydrophilic substrate, such as fused silica, soda-lime, borosilicate glass, aluminum silicate, silicon nitride, indium tin oxide substrates. Conversely, applying the formulations of 1-25 onto an optically transparent hydrophobic substrate, such as polyethylene terephthalate, polyimide, acrylic polymers, cyclic olefin copolymer, polycarbonate, polystyrene, silicone.

31. The nanocomposite of any of the embodiments 26-29 wherein the % T of the cured nanocomposite at thicknesses less than 10 microns is 99%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10% in the visible wavelengths.

32. The nanocomposite of any of the embodiments 26-29 and 31 wherein the cured nanocomposite refractive

TABLE 1

| Test Liquid and Formulation | Teflon Contact Angle (°) | Static Surface Tension (dyne/cm) | Polar Component of Surface Tension (dyne/cm) | Dispersive Component of Surface Tension (dyne/cm) | Polarity (%) |
|---|---|---|---|---|---|
| BA | 68.7 ± 3.6 | 36.7 | −0.1 ± 3.2 | 36.8 ± 3.2 | −0.3 |
| PEA | 72.2 ± 2.0 | 38.4 | 1.4 ± 1.8 | 37.0 ± 1.8 | 3.6 |
| NVP | 71.9 ± 4.1 | 38.1 | 1.4 ± 3.8 | 36.7 ± 3.8 | 3.7 |
| PBA | 82.8 ± 4.7 | 42.0 | 9.2 ± 4.7 | 32.9 ± 4.7 | 21.9 |
| BYK 378 | 47.8 ± 2.0 | 23.9 | 0.4 ± 0.7 | 23.5 ± 0.7 | 1.8 |
| Nanocomposite B1 | 71.3 ± 3.5 | 36.0 | 2.8 ± 2.9 | 33.2 ± 2.9 | 7.8 |
| Nanocomposite C1 | 71.9 ± 2.8 | 35.4 | 3.8 ± 2.2 | 31.5 ± 2.2 | 10.8 |
| Nanocomposite D3 | 72.6 ± 4.0 | 36.1 | 3.8 ± 3.3 | 32.2 ± 3.3 | 10.5 |

26. A nanocomposite comprising a cured or partially cured formulation of any one of embodiments 1-25 wherein the formulation is cured via UV irradiation under UV LED sources with wavelengths at 365, 385, 395 and 405 nm. Films from said formulation are UV-cured with a mercury "D", "H" and "V" lamp(s). UV doses ranges from 0.1-10 J/cm². Preferred UV doses are 0.5-2 J/cm². UV cure occurs under air or inert conditions, specifically nitrogen atmosphere.

27. A nanocomposite of embodiment 26 where in the film thickness ranges from 50 nanometers to 100 micrometers. Preferred film thickness values range from 0.5 to 20 micrometers.

index is 1.54-1.56, 1.56-1.58, 1.58-1.60, 1.60-1.62, or 1.62-1.64, 1.64-1.66, or 1.66-1.68, or 1.68-1.70, or 1.70-1.72, or 1.72-1.74, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00 at 550 nm.

Nanocomposite Formulation

In some embodiments, the present disclosure provides a solvent-free or solvent-less nanocomposite formulation comprising metal oxide nanocrystals such as zirconium oxide, titanium oxide, hafnium oxide, zinc oxide, tantalum oxide, niobium oxide, or a mixture of at least two of said oxides; wherein the average particle diameter of the at least partially capped nanocrystals is in the range from 1-40 nm; wherein said nanocrystals are at least partially capped with at least one capping agent selected from the group consisting of methyltrimethoxysilane, n-propyltrimethoxysilane, n-propyltriethoxysilane, n-octyltrimethoxysilane, n-octyltriethoxysilane, phenytrimethoxysilane, dodecyltrimethoxysilane, m,p-ethylphenethyl trimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-(acryloyloxy)propyl trimethoxysilane, 3-isocyanatopropyltriethoxysilane, 3-isocyanatopropyltrimethoxysilane, and glycidoxypropyltrimethoxysilane, vinyltrimethoxysilane, allyltrimethoxysilane, 1-hexenyltrimethoxysilane, 1-octenyltrimethoxysilane, heptanol, hexanol, octanol, benzyl alcohol, phenol, ethanol, propanol, butanol, oleylalcohol, dodecylalcohol, octadecanol and triethylene glycol monomethyl ether, octanoic acid, acetic acid, propionic acid, 2-[2-(2-methoxyethoxy)ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(methacryloyloxy)ethyl succinate, or any combination thereof. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), trimethylolpropane ethoxylate tri(meth)acrylate (EOTMPTA and EOTMPTMA), 1,6-hexanediol di(meth)acrylate (HDDA and HDDMA), di(ethyleneglycol) di(meth)acrylate (DEGDA and DEGDMA), ethylene glycol diacrylate, glycerol 1,3-diglycerolate diacrylate, tri(propylene glycol) diacrylate, 1,6-hexanediol ethoxylate diacrylate, ethylene glycol phenyl ether (meth)acrylate (PEA and PEMA), 2-hydroxy-3-phenoxypropyl acrylate (HPPA), 2-hydroxy-3-phenoxypropyl methacrylate (HPPMA), 2-phenoxy benzyl acrylate (PBA), biphenyl methacrylate (BPMA), 2-phenylphenol methacrylate (PPMA), isobutyl acrylate (IBA), 2-phenylethyl acrylate (2-PEA), 2-(phenylthio)ethyl acrylate (PTEA), sulfur-containing commercial resins and adhesives such as #18109, #18165 and #6205 (NTT-AT); and LumipluS LP-1100, LPB-1102, LPJ-1102 and LPS-1130 (Mitsubishi Gas Chemical Company), N-vinyl pyrrolidone (NVP), phenyl norborene, styrene (STY), 4-methylstyrene (4MS), 4-vinylanisole (4VA), divinylbenzene (DVB), trimethylolpropane tri(3-mercaptopropionate) (TMPMP), pentaerythritol tetra(3-mercaptopropionate) (PETMP), ethylene glycol dimercaptopropionate, ethylene glycol dimercaptoacetate, thiodiethanethiol, bis(mercaptoethyl)ether, 2,2'-(ethylenedioxy)diethanethiol, phenanthrene (PhA), 9-cyanophenanthrene, triphenyl methane, benzoquinoline, 9-vinylcarbazole (NVCb) and combinations thereof. The formulations comprise curing agents and photoinitiators used for photopolymerization and/or thermal polymerization comprising Ebecryl® P115, or benzophenone and its derivatives such as Ebecryl P39, benzophenone, SpeedCure BEM (Lambson USA Ltd, Rutherford, CT, USA) or organophosphines such as diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. The formulations comprise surfactants, wetting agents, leveling agents, defoaming agents and dispersing agents that facilitate efficient inkjet-printing comprising BYK-331, BYK-377, BYK-378, (BYK Chemie, GMBH) and fluoro-surfactants such as Novec 4430, Novec 4432, and Novec 4434 (3M, St. Paul, MN, USA), Capstone FS-3100 (The Chemours Company, Wilmington, DE, USA), BYK-352, BYK-353, BYK-356, BYK-361N, BYK-322, BYK-323, BYK-350 (BYK Chemie, GMBH), BYK-UV3530, DISPERBYK-101, DISPERBYK-130, DISPERBYK-140, DISPERBYK-160, DISPERBYK-161, DISPERBYK-162, DISPERBYK-163, DISPERBYK-164, DISPERBYK-165, DISPERBYK-166, DISPERBYK-170, DISPERBYK-171, DISPERBYK-182, DISPERBYK-2000, DISPERBYK-2001 (BYK Chemie, GMBH), Solsperse 32000, Solsperse 36000, Solsperse 28000, Solsperse 20000, Solsperse 41000, and Solsperse 45000 (Lubrizol, Wickliffe, OH, USA).

In some embodiments, the present disclosure provides a solvent-free or solvent-less nanocomposite formulations comprising metal oxide nanocrystals such as zirconium oxide, titanium oxide, or a mixture of the two said oxides; wherein the average particle diameter of the at least partially capped nanocrystals is in the range from about 5-30 nm; wherein said nanocrystals are at least partially capped with at least one capping agent selected from the group consisting of 3-(methacryloyloxy)propyl trimethoxysilane, 3-(acryloyloxy)propyl trimethoxysilane, and/or methoxy(triethyleneoxy)propyltrimethoxysilane. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), ethylene glycol phenyl ether (meth)acrylate (PEA and PEMA), 2-phenoxy benzyl acrylate (PBA), biphenyl methacrylate (BPMA), 2-phenylethyl acrylate (2-PEA), 2-(phenylthio)ethyl acrylate (PTEA), N-vinyl pyrrolidone (NVP), 4-methylstyrene (4MS), divinylbenzene (DVB), 9-vinylcarbazole (NVCb) and combinations thereof. The formulations comprise curing agents and photoinitiators used for photopolymerization such as diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. The formulations comprise surfactants such as BYK-378 and/or BYK-333, wetting agents, leveling agents, defoaming agents and dispersing agents that facilitate efficient inkjet-printing.

In some embodiments, the present disclosure provides a solvent-free or solvent-less nanocomposite formulation comprising metal oxide nanocrystals such as zirconium oxide, titanium oxide, or a mixture of the two said oxides; wherein the average particle diameter of the at least partially capped nanocrystals is in the range from about 10-30 nm; wherein said nanocrystals are at least partially capped with at least one capping agent selected from the group consisting of 3-(methacryloyloxy)propyl trimethoxysilane, 3-(acryloyloxy)propyl trimethoxysilane, and/or methoxy(triethyleneoxy)propyltrimethoxysilane. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), ethylene glycol phenyl ether (meth)acrylate (PEA and PEMA), 2-phenoxy benzyl acrylate (PBA), biphenyl methacrylate (BPMA), 2-phenylethyl acrylate (2-PEA), 2-(phenylthio)ethyl acrylate (PTEA), N-vinyl pyrrolidone (NVP), 4-methylstyrene (4MS), divinylbenzene (DVB), 9-vinylcarbazole (NVCb) and combinations thereof. The formulations comprise curing agents and photoinitiators used for photopolymerization such as diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. The formulations comprise surfactants, wetting agents, leveling agents, defoaming agents and dispersing agents that facilitate efficient inkjet-printing comprising BYK-378 and/or BYK-333. The formulations comprise adhesion promoters, such as organo functional silanes, comprising 3-aminopropyltriethoxysilane. The formulations antioxidants or oxygen inhibitors comprising butylated hydroxytoluene (BHT), Irganox 1010, Irganox 1076, and/or SongNox® 1076.

In some embodiments, the present disclosure provides a solvent-free or solvent-less nanocomposite formulations which comprise metal oxide nanocrystals such as zirconium oxide, titanium oxide, or a mixture of the two said oxides; wherein the average particle diameter of the at least partially capped nanocrystals is in the range from about 10-30 nm; wherein said nanocrystals are at least partially capped with at least one capping agent selected from the group consisting of 3-(methacryloyloxy)propyl trimethoxysilane, 3-(acryloyloxy)propyl trimethoxysilane, and/or methoxy(triethyleneoxy)propyltrimethoxysilane. Weight loadings of the described capped nanocrystals are 20-80 wt %. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), ethylene glycol phenyl ether (meth)acrylate (PEA and PEMA), 2-phenoxy benzyl acrylate (PBA), biphenyl methacrylate (BPMA), 2-phenylethyl acrylate (2-PEA), 2-(phenylthio)ethyl acrylate (PTEA), N-vinyl pyrrolidone (NVP), 4-methylstyrene (4MS), divinylbenzene (DVB), 9-vinylcarbazole (NVCb) and combinations thereof. Weight loadings of the described reactive monomers are 20-80 wt %. The formulations comprise curing agents and photoinitiators used for photopolymerization including diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. Weight loadings of the described curing agents or photoinitiators are 0.1-20.0 wt %. The formulations comprise surfactants, wetting agents, leveling agents, defoaming agents and dispersing agents that facilitate efficient inkjet-printing comprising BYK-378 and/or BYK-333. Weight loadings of the described surfactants are 0.1-2.0 wt %.

In some embodiments, the present disclosure provides an inkjet-printable, solvent-free or solvent-less nanocomposite formulations which comprise metal oxide nanocrystals such as zirconium oxide, titanium oxide, or a mixture of the two said oxides; wherein the average particle diameter of the at least partially capped nanocrystals is in the range from about 10-30 nm; wherein said nanocrystals are at least partially capped with at least one capping agent selected from the group consisting of 3-(methacryloyloxy)propyl trimethoxysilane, 3-(acryloyloxy)propyl trimethoxysilane, and/or methoxy(triethyleneoxy)propyltrimethoxysilane. Weight loadings of the described capped nanocrystals are 35-70 wt %. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), ethylene glycol phenyl ether (meth)acrylate (PEA and PEMA), 2-phenoxy benzyl acrylate (PBA), biphenyl methacrylate (BPMA), 2-phenylethyl acrylate (2-PEA), 2-(phenylthio)ethyl acrylate (PTEA), N-vinyl pyrrolidone (NVP), 4-methylstyrene (4MS), divinylbenzene (DVB), 9-vinylcarbazole (NVCb) and combinations thereof. Weight loadings of the described reactive monomers are 30-65 wt %. The formulations comprise curing agents and photoinitiators used for photopolymerization including diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. Weight loadings of the described curing agents or photoinitiators are 0.1-3.0 wt %. The formulations comprise surfactants, wetting agents, leveling agents, defoaming agents and dispersing agents that facilitate efficient inkjet-printing comprising BYK-378 and/or BYK-333. Weight loadings of the described surfactants are 0.1-1.0 wt %.

In some embodiments, the present disclosure provides an inkjet-printable, solvent-free or solvent-less nanocomposite formulations which comprise metal oxide nanocrystals such as zirconium oxide, titanium oxide, or a mixture of the two said oxides; wherein the average particle diameter of the at least partially capped nanocrystals is in the range from about 10-30 nm; wherein said nanocrystals are at least partially capped with at least one capping agent selected from the group consisting of 3-(methacryloyloxy)propyl trimethoxysilane, 3-(acryloyloxy)propyl trimethoxysilane, and/or methoxy(triethyleneoxy)propyltrimethoxysilane. Weight loadings of the described capped nanocrystals are 35-70 wt %. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), ethylene glycol phenyl ether (meth)acrylate (PEA and PEMA), 2-phenoxy benzyl acrylate (PBA), biphenyl methacrylate (BPMA), 2-phenylethyl acrylate (2-PEA), 2-(phenylthio)ethyl acrylate (PTEA), N-vinyl pyrrolidone (NVP), 4-methylstyrene (4MS), divinylbenzene (DVB), 9-vinylcarbazole (NVCb) and combinations thereof. Weight loadings of the described reactive monomers are 30-65 wt %. The formulations comprise curing agents and photoinitiators used for photopolymerization including diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. Weight loadings of the described curing agents or photoinitiators are 0.1-3.0 wt %. The formulations comprise surfactants, wetting agents, leveling agents, defoaming agents and dispersing agents that facilitate efficient inkjet-printing comprising BYK-378 and/or BYK-333. Weight loadings of the described surfactants are 0.1-1.0 wt %. Formulation viscosities range from 6-80 cP at 25 C. Formulation RI values at 589 nm ranges from 1.50 to 1.80, or 1.58-1.7.

In some embodiments, the present disclosure provides a higher-viscosity, solvent-free or solvent-less nanocomposite formulations which comprise metal oxide nanocrystals such as zirconium oxide, titanium oxide, or a mixture of the two said oxides; wherein the average particle diameter of the at least partially capped nanocrystals is in the range from about 10-30 nm; wherein said nanocrystals are at least partially capped with at least one capping agent selected from the group consisting of 3-(methacryloyloxy)propyl trimethoxysilane, 3-(acryloyloxy)propyl trimethoxysilane, and/or methoxy(triethyleneoxy)propyltrimethoxysilane. Weight loadings of the described capped nanocrystals are 60-80 wt %. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), ethylene glycol phenyl ether (meth)acrylate (PEA and PEMA), 2-phenoxy benzyl acrylate (PBA), biphenyl methacrylate (BPMA), 2-phenylethyl acrylate (2-PEA), 2-(phenylthio)ethyl acrylate (PTEA), N-vinyl pyrrolidone (NVP), 4-methylstyrene (4MS), divinylbenzene (DVB), 9-vinylcarbazole (NVCb) and combinations thereof. Weight loadings of the described reactive monomers are 20-40 wt %. The formulations comprise curing agents and photoinitiators used for photopolymerization include diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. Weight loadings of the described curing agents or photoinitiators are 0.1-3.0 wt %. The formulations comprise surfactants, wetting agents, leveling agents, defoaming agents and dispersing agents that facilitate efficient inkjet-printing comprising BYK-378 and/or BYK-333. Weight loadings of the described surfactants are 0.1-1.0 wt %. Formulation viscosities range from 80-12,000 cP at 25 C. Formulation RI values at 589 nm ranges from 1.50 to 1.80, or 1.58-1.7.

Nanocomposites

In some embodiments, the present disclosure provides nanocomposites comprising metal oxide nanocrystals such as zirconium oxide, titanium oxide, hafnium oxide, zinc oxide, tantalum oxide, niobium oxide, or a mixture of at least two of said oxides; wherein the average particle diameter of the at least partially capped nanocrystals is in the range from 1-40 nm; wherein said nanocrystals are at least partially capped with at least one capping agent selected from the group consisting of methyltrimethoxysilane, n-propyltrimethoxysilane, n-propyltriethoxysilane, n-octyltrimethoxysilane, n-octyltriethoxysilane, phenytrimethoxysilane, dodecyltrimethoxysilane, m,p-ethylphenethyl trimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-(acryloyloxy)propyl trimethoxysilane, 3-isocyanatopropyltriethoxysilane, 3-isocyanatopropyltrimethoxysilane, and glycidoxypropyltrimethoxysilane, vinyltrimethoxysilane, allyltrimethoxysilane, 1-hexenyltrimethoxysilane, 1-octenyltrimethoxysilane, heptanol, hexanol, octanol, benzyl alcohol, phenol, ethanol, propanol, butanol, oleylalcohol, dodecylalcohol, octadecanol and triethylene glycol monomethyl ether, octanoic acid, acetic acid, propionic acid, 2-[2-(2-methoxyethoxy)ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(methacryloyloxy)ethyl succinate, or any combination thereof. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), trimethylolpropane ethoxylate tri(meth)acrylate (EOTMPTA and EOTMPTMA), 1,6-hexanediol di(meth)acrylate (HDDA and HDDMA), di(ethyleneglycol) di(meth)acrylate (DEGDA and DEGDMA), ethylene glycol diacrylate, glycerol 1,3-diglycerolate diacrylate, tri(propylene glycol) diacrylate, 1,6-hexanediol ethoxylate diacrylate, ethylene glycol phenyl ether (meth) acrylate (PEA and PEMA), 2-hydroxy-3-phenoxypropyl acrylate (HPPA), 2-hydroxy-3-phenoxypropyl methacrylate (HPPMA), 2-phenoxy benzyl acrylate (PBA), biphenyl methacrylate (BPMA), 2-phenylphenol methacrylate (PPMA), isobutyl acrylate (IBA), 2-phenylethyl acrylate (2-PEA), 2-(phenylthio)ethyl acrylate (PTEA), sulfur-containing commercial resins and adhesives such as #18109, #18165 and #6205 (NTT-AT); and LumipluS LP-1100, LPB-1102, LPJ-1102 and LPS-1130 (Mitsubishi Gas Chemical Company), N-vinyl pyrrolidone (NVP), phenyl norborene, styrene (STY), 4-methylstyrene (4MS), 4-vinylanisole (4VA), divinylbenzene (DVB), trimethylolpropane tri(3-mercaptopropionate) (TMPMP), pentaerythritol tetra(3-mercaptopropionate) (PETMP), ethylene glycol dimercaptopropionate, ethylene glycol dimercaptoacetate, thiodiethanethiol, bis(mercaptoethyl)ether, 2,2'-(ethylenedioxy)diethanethiol, phenanthrene (PhA), 9-cyanophenanthrene, triphenyl methane, benzoquinoline, 9-vinylcarbazole (NVCb) and combinations thereof. The formulations comprise curing agents and photoinitiators used for photopolymerization and/or thermal polymerization comprising Ebecryl® P115, or benzophenone and its derivatives such as Ebecryl P39, benzophenone, SpeedCure BEM (Lambson USA Ltd, Rutherford, CT, USA) or organophosphines such as diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. The formulations comprise surfactants, wetting agents, leveling agents, defoaming agents and dispersing agents that facilitate efficient inkjet-printing comprising BYK-331, BYK-377, BYK-378, (BYK Chemie, GMBH) and fluoro-surfactants such as Novec 4430, Novec 4432, and Novec 4434 (3M, St. Paul, MN, USA), Capstone FS-3100 (The Chemours Company, Wilmington, DE, USA), BYK-352, BYK-353, BYK-356, BYK-361N, BYK-322, BYK-323, BYK-350 (BYK Chemie, GMBH), BYK-UV3530, DISPERBYK-101, DISPERBYK-130, DISPERBYK-140, DISPERBYK-160, DISPERBYK-161, DISPERBYK-162, DISPERBYK-163, DISPERBYK-164, DISPERBYK-165, DISPERBYK-166, DISPERBYK-170, DISPERBYK-171, DISPERBYK-182, DISPERBYK-2000, DISPERBYK-2001 (BYK Chemie, GMBH), Solsperse 32000, Solsperse 36000, Solsperse 28000, Solsperse 20000, Solsperse 41000, and Solsperse 45000 (Lubrizol, Wickliffe, OH, USA).

In some embodiments, the present disclosure provides nanocomposites comprising metal oxide nanocrystals such as zirconium oxide, titanium oxide, or a mixture of the two said oxides; wherein the average particle diameter of the at least partially capped nanocrystals is in the range from about 10-30 nm; wherein said nanocrystals are at least partially capped with at least one capping agent selected from the group consisting of 3-(methacryloyloxy)propyl trimethoxysilane, 3-(acryloyloxy)propyl trimethoxysilane, and/or methoxy(triethyleneoxy)propyltrimethoxysilane. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), ethylene glycol phenyl ether (meth)acrylate (PEA and PEMA), 2-phenoxy benzyl acrylate (PBA), biphenyl methacrylate (BPMA), 2-phenylethyl acrylate (2-PEA), 2-(phenylthio)ethyl acrylate (PTEA), N-vinyl pyrrolidone (NVP), 4-methylstyrene (4MS), divinylbenzene (DVB), 9-vinylcarbazole (NVCb) and combinations thereof. The formulations comprise curing agents and photoinitiators used for photopolymerization include diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. The formulations comprise surfactants, wetting agents, leveling agents, defoaming agents and dispersing agents that facilitate efficient inkjet-printing comprising BYK-378 and/or BYK-333.

In some embodiments, the present disclosure provides nanocomposites comprising metal oxide nanocrystals such as zirconium oxide, titanium oxide, or a mixture of the two said oxides; wherein the average particle diameter of the at least partially capped nanocrystals is in the range from about 10-30 nm; wherein said nanocrystals are at least partially capped with at least one capping agent selected from the group consisting of 3-(methacryloyloxy)propyl trimethoxysilane, 3-(acryloyloxy)propyl trimethoxysilane, and/or methoxy(triethyleneoxy)propyltrimethoxysilane. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), ethylene glycol phenyl ether (meth)acrylate (PEA and PEMA), 2-phenoxy benzyl acrylate (PBA), biphenyl methacrylate (BPMA), 2-phenylethyl acrylate (2-PEA), 2-(phenylthio)ethyl acrylate (PTEA), N-vinyl pyrrolidone (NVP), 4-methylstyrene (4MS), divinylbenzene (DVB), 9-vinylcarbazole (NVCb) and combinations thereof. The formulations comprise curing agents and photoinitiators used for photopolymerization include diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. The formulations comprise surfactants, wetting agents, leveling agents, defoaming agents and dispersing agents that facilitate efficient inkjet-printing comprising BYK-378 and/or BYK-333. The formulations comprise adhesion promoters, such as organo functional silanes, comprising 3-aminopropyltriethoxysilane. The formulations antioxidants or oxygen inhibitors comprising butylated hydroxytoluene (BHT), Irganox 1010, Irganox 1076, and/or SongNox® 1076.

In some embodiments, the present disclosure provides nanocomposites comprising metal oxide nanocrystals such as zirconium oxide, titanium oxide, or a mixture of the two said oxides; wherein the average particle diameter of the at least partially capped nanocrystals is in the range from about 10-30 nm; wherein said nanocrystals are at least partially capped with at least one capping agent selected from the group consisting of 3-(methacryloyloxy)propyl trimethoxysilane, 3-(acryloyloxy)propyl trimethoxysilane, and/or methoxy(triethyleneoxy)propyltrimethoxysilane. Weight loadings of the described capped nanocrystals are 20-80 wt %. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), ethylene glycol phenyl ether (meth)acrylate (PEA and PEMA), 2-phenoxy benzyl acrylate (PBA), biphenyl methacrylate (BPMA), 2-phenylethyl acrylate (2-PEA), 2-(phenylthio)ethyl acrylate (PTEA), N-vinyl pyrrolidone (NVP), 4-methylstyrene (4MS), divinylbenzene (DVB), 9-vinylcarbazole (NVCb) and combinations thereof. Weight loadings of the described reactive monomers are 20-80 wt %. The formulations comprise curing agents and photoinitiators used for photopolymerization include diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. Weight loadings of the described curing agents or photoinitiators are 0.1-20.0 wt %. The formulations comprise surfactants, wetting agents, leveling agents, defoaming agents and dispersing agents that facilitate efficient inkjet-printing comprising BYK-378 and/or BYK-333. Weight loadings of the described surfactants are 0.1-2.0 wt %.

In some embodiments, the present disclosure provides nanocomposites derived from inkjet-printable, solvent-free or solvent-less nanocomposite formulations comprising metal oxide nanocrystals such as zirconium oxide, titanium oxide, or a mixture of the two said oxides; wherein the average particle diameter of the at least partially capped nanocrystals is in the range from about 10-30 nm; wherein said nanocrystals are at least partially capped with at least one capping agent selected from the group consisting of 3-(methacryloyloxy)propyl trimethoxysilane, 3-(acryloyloxy)propyl trimethoxysilane, and/or methoxy(triethyleneoxy)propyltrimethoxysilane. Weight loadings of the described capped nanocrystals are 35-70 wt %. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), ethylene glycol phenyl ether (meth)acrylate (PEA and PEMA), 2-phenoxy benzyl acrylate (PBA), biphenyl methacrylate (BPMA), 2-phenylethyl acrylate (2-PEA), 2-(phenylthio)ethyl acrylate (PTEA), N-vinyl pyrrolidone (NVP), 4-methylstyrene (4MS), divinylbenzene (DVB), 9-vinylcarbazole (NVCb) and combinations thereof. Weight loadings of the described reactive monomers are 30-65 wt %. The formulations comprise curing agents and photoinitiators used for photopolymerization include diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. Weight loadings of the described curing agents or photoinitiators are 0.1-3.0 wt %. The formulations comprise surfactants, wetting agents, leveling agents, defoaming agents and dispersing agents that facilitate efficient inkjet-printing comprising BYK-378 and/or BYK-333. Weight loadings of the described surfactants are 0.1-1.0 wt %.

In some embodiments, the present disclosure provides nanocomposites derived from inkjet-printable, solvent-free or solvent-less nanocomposite formulations comprising metal oxide nanocrystals such as zirconium oxide, titanium oxide, or a mixture of the two said oxides; wherein the average particle diameter of the at least partially capped nanocrystals is in the range from about 10-30 nm; wherein said nanocrystals are at least partially capped with at least one capping agent selected from the group consisting of 3-(methacryloyloxy)propyl trimethoxysilane, 3-(acryloyloxy)propyl trimethoxysilane, and/or methoxy(triethyleneoxy)propyltrimethoxysilane. Weight loadings of the described capped nanocrystals are 35-70 wt %. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), ethylene glycol phenyl ether (meth)acrylate (PEA and PEMA), 2-phenoxy benzyl acrylate (PBA), biphenyl methacrylate (BPMA), 2-phenylethyl acrylate (2-PEA), 2-(phenylthio)ethyl acrylate (PTEA), N-vinyl pyrrolidone (NVP), 4-methylstyrene (4MS), divinylbenzene (DVB), 9-vinylcarbazole (NVCb) and combinations thereof. Weight loadings of the described reactive monomers are 30-65 wt %. The formulations comprise curing agents and photoinitiators used for photopolymerization include diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. Weight loadings of the described curing agents or photoinitiators are 0.1-3.0 wt %. The formulations comprise surfactants, wetting agents, leveling agents, defoaming agents and dispersing agents that facilitate efficient inkjet-printing comprising BYK-378 and/or BYK-333. Weight loadings of the described surfactants are 0.1-1.0 wt %. Nanocomposite film RI values at 550 nm ranges from 1.63 to 1.75. Nanocomposite film % T values above 400 nm ranges from 80 to 97% for film thicknesses with 3-10 um.

In some embodiments, the present disclosure provides nanocomposites derived from higher viscosity (80-12,000 cP), solvent-free or solvent-less nanocomposite formulations comprising metal oxide nanocrystals such as zirconium oxide, titanium oxide, or a mixture of the two said oxides; wherein the average particle diameter of the at least partially capped nanocrystals is in the range from about 10-30 nm; wherein said nanocrystals are at least partially capped with at least one capping agent selected from the group consisting of 3-(methacryloyloxy)propyl trimethoxysilane, 3-(acryloyloxy)propyl trimethoxysilane, and/or methoxy(triethyleneoxy)propyltrimethoxysilane. Weight loadings of the described capped nanocrystals are 60-80 wt %. The formulations comprise reactive monomers, oligomers, polymers, diluents and/or organic dopants comprising benzyl (meth)acrylate (BA and BMA), trimethylolpropane tri(meth)acrylate (TMPTA and TMPTMA), ethylene glycol phenyl ether (meth)acrylate (PEA and PEMA), 2-phenoxy benzyl acrylate (PBA), biphenyl methacrylate (BPMA), 2-phenylethyl acrylate (2-PEA), 2-(phenylthio)ethyl acrylate (PTEA), N-vinyl pyrrolidone (NVP), 4-methylstyrene (4MS), divinylbenzene (DVB), 9-vinylcarbazole (NVCb) and combinations thereof. Weight loadings of the described reactive monomers are 20-40 wt %. The formulations comprise curing agents and photoinitiators used for photopolymerization include diphenyl(2,4,6-trimethylbenzoyl)-phosphine oxide (TPO), Irgacure 819, or Irgacure 184 (BASF USA, Florham Park, NJ, USA), 2,2-azobis(2-methylpropionitrile) (AIBN) and combinations thereof. Weight loadings of the described curing agents or photoinitiators are 0.1-3.0 wt %. The formulations comprise surfactants, wetting agents, leveling agents, defoaming agents and dispersing agents that facilitate efficient inkjet-printing comprising BYK-378 and/or BYK-333. Weight loadings of the described surfactants are 0.1-1.0 wt %. Nanocomposite film RI values at 550 nm range from 1.75 to 1.90. Nanocomposite film % T values above 400 nm range from 80 to 97% for film thicknesses with 3-10 um.

In some embodiments, the disclosure provides:

[1] a formulation comprising at least partially capped metal oxide nanocrystals and a matrix comprising at least one of a monomer, oligomer or a polymer, e.g., the at least partially capped metal oxide nanocrystals are dispersed in the matrix, wherein the metal oxide iszirconium oxide, titanium oxide, hafnium oxide, zinc oxide, tantalum oxide, niobium oxide, or a mixture of at least two of said oxides, wherein the formulation comprises less than 5 wt % solvent;

[2] the formulation of [1] optionally further comprising one or more agents independently selected from a curing agent, a surfactant, a wetting agent, an antioxidant, an adhesion promoter, a leveling agent, a dispersing agent, a plasticizer, a toughener, a thickener, a thinner, a dispersant, a flexibilizer, an organic dopant, and other functional additives;

[3] the formulation of [1] wherein the matrix comprises one or more agents independently selected from of acrylate and/or methacrylate monomers, reactive diluents, and a curing agent and, optionally, at least one surfactant or at least one wetting agent;

[4] the formulation of any one of [1]-[3], wherein the average particle diameter of the at least partially capped nanocrystals is in the range from 1-40 nm, preferably less than 30 nm, as measured by DLS or TEM;

[5] the formulation of any one of [1]-[4], wherein said nanocrystals are at least partially capped with at least one capping agent selected from the group consisting of methyltrimethoxysilane, n-propyltrimethoxysilane, n-propyltriethoxysilane, n¬octyltrimethoxysilane, n-octyltriethoxysilane, phenytrimethoxysilane, dodecyltrimethoxysilane, m,p-ethylphenethyl trimethoxysilane, 2-[methoxy(polyethyleneoxy)propyl]¬ trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-(acryloyloxy)propyl trimethoxysilane, 3-isocyanatopropyltriethoxysilane, 3-isocyanatopropyltrimethoxysilane, glycidoxypropyltrimethoxysilane, vinyltrimethoxysilane, allyltrimethoxysilane, 1-hexenyltrimethoxysilane, 1-octenyltrimethoxysilane, heptanol, hexanol, octanol, benzyl alcohol, phenol, ethanol, propanol, butanol, oleylalcohol, dodecylalcohol, octadecanol, triethylene glycol monomethyl ether, octanoic acid, acetic acid, propionic acid, 2-[2-(2-methoxyethoxy)ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(Methacryloyloxy)ethyl succinate, and combinations thereof;

[6] the formulation of any one of [1]-[5], having weight loadings of the metal oxide nanocrystals ranging from 20 wt % to 80 wt % of the formulation;

[7] the formulation of any one of [1]-[6], wherein the formulation further comprises a monofunctional acrylate and/or methacrylate monomer with high refractive index, such as, benzyl acrylate, benzyl methacrylate (BA and BMA), ethylene glycol phenyl ether acrylate, ethylene glycol phenyl ether methacrylate (PEA and PEMA), 2-hydroxy-3-phenoxypropyl acrylate, 2-hydroxy-3-phenoxypropyl methacrylate (HPPA and HPPMA), 2-phenoxy benzyl acrylate (PBA), biphenyl methacrylate (BPMA), 2-phenylphenol methacrylate (PPMA), isobutyl acrylate (IBA), 2-phenylethyl acrylate (2-PEA), 2-(phenylthio)ethyl acrylate (PTEA), or combinations thereof;

[8] the formulation of any one of [1]-[7], wherein the formulation further comprises a di-, tri-, tetra- and/or penta-functional acrylate and/or methacrylate monomer, such as, 1,6-hexanediol diacrylate, 1,6-hexanediol di-methacrylate (HDDA and HDDMA), di(ethyleneglycol) diacrylate, di(ethyleneglycol) di-methacrylate (DEGDA and DEGDMA), ethylene glycol diacrylate, glycerol 1,3-diglycerolate diacrylate, tri(propylene glycol) diacrylate, trimethylolpropane triacrylate, trimethylolpropane tri-methacrylate (TMPTA and TMPTMA), trimethylolpropane ethoxylate triacrylate, trimethylolpropane ethoxylate tri-methacrylate (EOTMPTA and EOTMPTMA), 1,6-hexanediol ethoxylate diacrylate, pentaerythritol tetraacrylate (PETA), dipentaerythritol penta-/hexa-acrylate (DPHA), or combinations thereof;

[9] the formulation of any one of [1]-[8], wherein the formulation further comprises a reactive diluent, such as, 1-vinyl-2-pyrrolidone (NVP), N-vinyl caprolactam, 2-(2-vinyloxyethoxy) ethyl acrylate, 2-(2-vinyloxyethoxy) ethyl methacrylate, isobutyl acrylate, styrene (STY), 4-methylstyrene (4MS), 4-vinylanisole (4VA) and divinylbenzene (DVB) wherein the weight percent of the reactive diluent is 25-70 wt % with respect to the total monomer content;

[10] the formulation of any one of [1]-[9] the formulation further comprises a di-, tri-, and/or tetra-functional thiol crosslinker, such as, trimethylolpropane tris(3-mercaptopropionate);

[11] the formulation of any one of [1]-[10], wherein the formulation further comprises a sulfur-containing resin and/or adhesive, e.g., sulfur-containing commercial resin and/or adhesive, such as #18109, #18165, #6205

(NTT-AT), LumipluS LP-1100, LPB-1102, LPJ-1102, LPS-1130 (Mitsubishi Gas Chemical Company), or a combination thereof;

[12] the formulation of any one of [1]-[11], wherein the formulation further comprises a reactive organic dopant, such as, phenanthrene (PhA) or 9-vinylcarbazole (NVCb), e.g., in the concentration range from 1 to 50 wt %;

[13] the formulation of any one of [1]-[12], wherein the formulation further comprises a surfactant or a combination of surfactants, such as, a polyether-modified siloxane, a fluoro-surfactant, or combinations thereof, that is either non-reactive or reactive in the acrylate monomer system, wherein the concentrations of said surfactantwithin the total formulation is in the range from 0.1-2.0 wt % or in the range from 0.5-1.0 wt %;

[14] the formulation of any one of [1]-[13], wherein the formulation optionally further comprises scattering particles, such as, titanium dioxide, aluminum oxide, silicon dioxide, and/or low- and or high-index polymer particles, wherein the scattering particle sizes range from 100-400 nm, wherein the concentrations of said scattering particles within the total formulation range from 0.1-30.0 wt % or 0.5-17.0 wt %;

[15] the formulation of any one of [1]-[14], further comprising a curing agent or photoinitiator, such as, Irgacure 184, Irgacure 819, TPO, Ebercryl P39, and/or Ebercryl P115, wherein the concentrations of said curing agent or photoinitiator within the total formulation is in the range from 0.1-20 wt % or in the range from 1.0-4.0 wt % with respect to the monomer content;

[16] the formulation of any one of [1]-[15], wherein said formulation does not contain benzyl methacrylate (BMA) or trimethylolpropane triacrylate (TMPTA);

[17] the formulation of [16], wherein the viscosity of the formulation is within the range of 5-100 cP, when measured at 25° C. with a Brookfield RVDV II+ cone and plate viscometer, preferred viscosities for inkjet-printing at 25° C. are 5-20 cP, when cartridge heating is applicable, viscosities at 25° C. can be 15-100 cP for cartridge temperatures between 35° C.-100° C., or the viscosity of the formulation is 5 cP-10 cP, or 10 cP-15 cP, 15 cP-20 cP, 20 cP-30 cP, 30 cP-50 cP, or 50 cP-100 cP, when measured at 25° C., for deposition methods other than inkjet-printing, viscosities can range from 100 cP-1,000 cP, 1,000 cP-5,000 cP or 5,000 cP-12,000 cP;

[18] the formulation of [17], wherein the nanocrystal loading is 35-40%, 40-45%, 45-50%, 50-55%, 55-60%, 60-65% and 65-70% by weight;

[19] the formulation of any of [17]-[18], wherein the refractive index of the formulation is 1.52-1.56, 1.56-1.58, 1.58-1.60, 1.60-1.62, or 1.62-1.64, 1.64-1.66, or 1.66-1.68, or 1.68-1.70, or 1.70-1.72, or 1.72-1.74, or 1.76-1.78, or 1.78-1.80 or 1.80-1.82, or 1.82-1.84, or 1.84-1.86, or 1.86-1.88, or 1.88-1.90, or 1.90-1.92, or 1.92-1.94 at 589 nm as measured by an Abbe refractometer;

[20] the formulation of any one of [17]-[19], wherein the surface tension of the formulation is within the range of 20-25 dyne/cm, 25-30 dyne/cm, 30-35 dyne/cm or 35-40 dyne/cm, when measured at 25° C. with a Rame-Hart surface tensiometer;

[21] the formulation of any one of [17]-[20], wherein the % T of the formulation is 99%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10% in the visible wavelengths (400-700 nm);

[22] the formulation of any one of [1]4211, which is inkjet-printable, e.g., droplets of the formulation can be ejected from printhead types, such as Dimatix DMC, Fujifilm SG1024/MA, Konica Minolta KM1024i, with droplet volumes between 6-40 pL at drop velocities from 3-9 m/s;

[23] a nanocomposite film prepared from a process comprising applying the formulation of any one of [1]4221 via spin coating, slot-die coating, screen-printing, ink-jet printing, nanoimprinting, photopatterning, 3D printing, dip coating, draw-bar coating, roll-to-roll printing, spray coating, dispensing, volume casting, screen printing, or any combination thereof, to a surface, and optionally curing the applied formulation;

[24] a nanocomposite comprising a cured or partially cured formulation of any one of [1]-[23], wherein the formulation is cured or partially cured via UV irradiation under a UV LED source with a wavelength at 365 nm, 385 nm, 395 nm, or 405 nm or via a mercury "D", "H" and/or "V" lamp(s) at a UV dose ranging from 0.1-10 J/cm2, or 0.5-2 J/cm2;

[25] a nanocomposite of [24], wherein the nanocomposite is a film with a thickness ranges from 50 nanometers to 100 micrometers, or from 0.5 micrometer to 20 micrometers;

[26] the nanocomposite of any of the [23]-[25], wherein the % T of the nanocomposite, cured or partially cured, at thicknesses less than 10 microns is 99%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10% in a visible wavelength from 400 nm-700 nm; or

[27] the nanocomposite of any of the [23]-[26] wherein the nanocomposite, cured or partially cured, has a refractive index of 1.54-1.56, 1.56-1.58, 1.58-1.60, 1.60-1.62, or 1.62-1.64, 1.64-1.66, or 1.66-1.68, or 1.68-1.70, or 1.70-1.72, or 1.72-1.74, or 1.76-1.78, or 1.78-1.80, or 1.80-1.82, or 1.82-1.84, or 1.84-1.86, or 1.86-1.88, or 1.88-1.90, or 1.90-1.92, or 1.92-1.94, or 1.94-1.96, or 1.96-1.98, or 1.98-2.00 at 550 nm.

BRIEF DESCRIPTION OF TABLES

Figure 1:
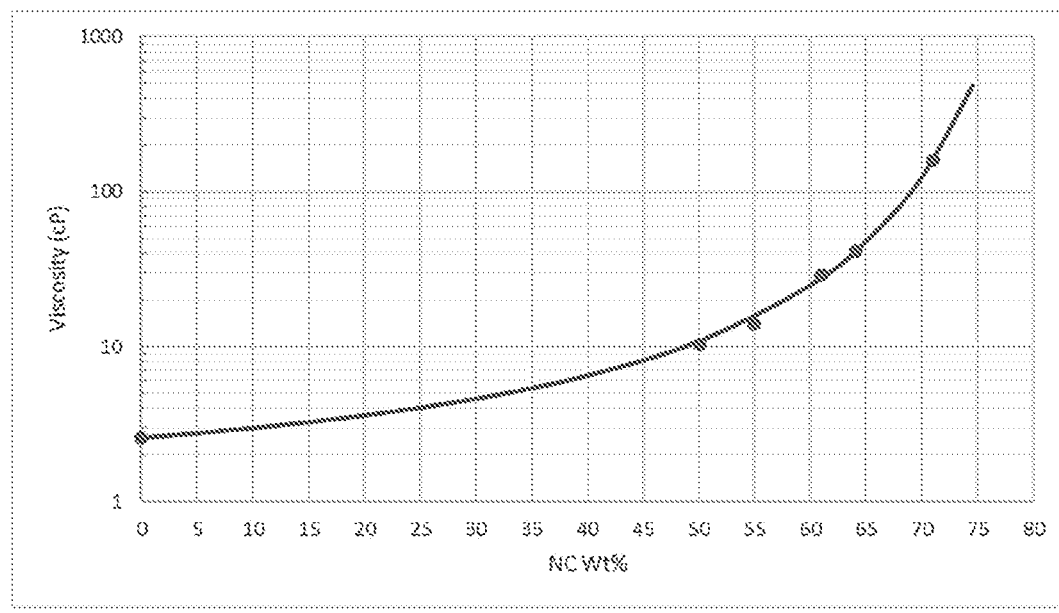
FIG. 1 shows exemplary viscosity at 25 C versus capped zirconia weight percent in BA as described in EXAMPLE 2.

Table 1 shows the contact angles on a Teflon surface and static surface tension values at 25 C and calculated polar, dispersive components of the surface tension and polarity (defined as the ratio of the polar component of the static surface tension divided by the total static surface tension for various monomers and formulations.

Table 2 shows nanocomposite formulations A1-A10 with different weight percent of capped ZrO2 and weight ratios of crosslinkers as described in EXAMPLE 1 and their respective viscosities.

Table 3 shows formulations with different weight percent of capped ZrO2 and weight ratios of crosslinkers as described in EXAMPLE 4 and 5 and their respective viscosities.

Table 4 shows formulations with different weight percent of capped ZrO2 and weight ratios of monomers and PhA additions as described in EXAMPLE 6 and their respective viscosities and film refractive indices.

Table 5 shows formulations with different weight percent of capped ZrO2 and weight ratios of monomers as described in EXAMPLE 7 and their respective viscosities and film refractive indices.

Table 6 shows formulations with different weight percent of capped TiO2 about 10 nm and weight ratios of BA and PBA monomers as described in EXAMPLE 8 and their respective viscosities, formulation RI values at 589 nm, nanocomposite film Ri values at 550 nm, film thicknesses and % T values at 400 and 700 nm.

Table 7 shows formulations with different weight percent of capped TiO2 about 30 nm and weight ratios of BA and PBA monomers as described in EXAMPLE 9 and their respective viscosities, formulation RI values at 589 nm, nanocomposite film Ri values at 550 nm, film thicknesses and % T values at 400 and 700 nm.

Table 8 shows formulations with different weight percent of capped ZrO2, mixed ZrO2/TiO2 (around 10 nm particle size) and TiO2 only and weight ratios of BA and NVP monomers as described in EXAMPLE 11 and their respective viscosities and film refractive indices.

Table 9 shows formulations with different weight percent of capped ZrO2, around 30 nm TiO2 and weight ratios of NTT-AT resins as described in EXAMPLE 12 and their respective nanocomposite film refractive indices.

Table 10 shows formulations with different weight percent of capped ZrO2, around 10 nm TiO2 and weight ratios of LumipluS resins as described in EXAMPLE 13 and their respective nanocomposite film refractive indices.

Characterization

In some embodiments, the presently disclosed formulation is analyzed using a TA instrument Q500 thermal gravimetric analyzer (TGA) to determine the inorganic solid content. The TGA is run with nanocrystal dispersions in a solvent with boiling point <200 C to determine the organic content of capped nanocrystals. The percent mass at 200° C. relative to the initial mass is regarded as capped nanocrystals and the percent mass at 700° C. relative to the initial mass is regarded as inorganic portion of the capped nanocrystal, i.e. inorganic solid content. The percent organics of capped nanocrystals (% Org) is defined as the difference between the percent mass at 200° C. (M200C) and at 700° C. (M700C) divided by the percent mass at 200° C.:

$$\% \ Org = \frac{M200C - M700C}{M200C} \times 100\%$$

For a nanocomposite or a formulation, the percent solids (% S) is calculated from the inorganic content of the nanocomposite and organic content of the capped nanocrystals measured in solvent:

$$\% \ S = \frac{M700C}{100\% - \% \ Org} \times 100\%$$

The capped nanocrystals of the presently disclosed formulation constitute less than 10% by weight of the total formulation, or 10%-20% by weight of the total formulation, or 20%-30% by weight of the total formulation, or 30%-40% by weight of the total formulation, or 40%-50% by weight of the total formulation, or 50%-60% by weight of the total formulation, or 60%-70% by weight of the total formulation, or 70%-80% by weight of the total formulation, or 80%-90% by weight of the total formulation, or 90%-93% by weight of the total formulation.

Optical transmittance is a common technique to evaluate the quality of a dispersion, formulation, and a nanocomposite film or coating. Light propagating through a sample can be absorbed, scattered, or transmitted. The normal transmittance at a given wavelength is defined as $Tn=I/I_0$, where $I_0$ is the intensity of incident light and I is the intensity of the light in the forward direction collected by the detector, which includes both light that is transmitted without scattering and light that is scattered into the forward direction. Theoretically the forward direction is defined as the same direction of the incident light, and however the detector usually collects light within a small solid angle around this direction due to the finite size of the detector. This transmittance is called normal transmittance or just transmittance, throughout this disclosure. The absorbance of a sample, i.e., optical density (OD), at a given wavelength is defined as:

$$OD = -\log_{10}\frac{I}{I_0}$$

When measuring normal transmittance, measurement artifacts, such as Fresnel reflections off various interfaces and absorption by cuvette walls, need to be accounted for and removed. This can be taken care of by using a reference, either by measuring the sample and reference side by side in the instrument, or by measuring the sample and reference sequentially and then correcting the data mathematically afterward. The liquid nanocrystal dispersion sample can be measured in a cuvette made of glass, quartz, or plastic, and due to the finite thickness of the cuvette wall, there are four interfaces where Fresnel reflections can occur, and two walls where absorption can occur. Using a cuvette with same material, wall thickness, and path length as the reference produce results with enough accuracy.

For thin-film nanocomposites, the coated substrate is measured against a blank substrate made of same material with same thickness and surface smoothness, either side by side, or sequentially, to correct absorption and reflection at interfaces. Because the coating may have a different refractive index than the substrate and air, the reflection off the front face of the film and the substrate may be slightly different, often resulting in higher than 100% transmittance based on the algorithm used by the spectrophotometer. The effect can be corrected but the step is complicated, and the error is usually small. For convenience, the transmittance data shown in this disclosure are as measured without correction.

Light that is neither transmitted nor scattered nor reflected is absorbed. The absorbance can be calculated by subtracting the transmitted, scattered, and reflected light from the incident light.

The optical transmittance at 450 nm of the presently disclosed formulation with no curing agent, when measured in a cuvette with 1 cm path length using a Perkin Elmer Lambda 850 spectrophotometer, is 99%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10%.

The optical transmittance at 400 nm of the presently disclosed formulation with no curing agent, when measured in a cuvette with 1 cm path length using a Perkin Elmer Lambda 850 spectrophotometer, is 99%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10%.

Formulations of the present disclosure have a viscosity of about 1 cP to about 12,000 cP. Formulations of the present disclosure have a viscosity of about 1 cP, about 2 cP, about 5 cP, about 10 cP, about 15 cP, about 20 cP, about 25 cP, about 30 cP, about 40 cP, about 50 cP, about 60 cP, about 75 cP, about 100 cP, about 200 cP, 500 cP, or about 1,000 cP, when measured with a Brookfield RVDV II+ cone and plate viscometer measured at 25 C.

The refractive index is measured using a Metricon's 2010/M model Prism Coupler which is equipped with 448 nm and 635 nm laser beam. One can calculate the estimated refractive index of the same material at a third wavelength. The calculation of the refractive index at 550 nm is based on a 2-term version of Cauchy's equation:

$$RI(w) = A + \frac{B}{w^2}$$

The A and B parameters depend on the measured RI values at specific wavelengths, which were chosen to be 448 and 635 nm. By representing parameters A and B in terms of RI (448 nm) and RI (635 nm), the following equation allows for the calculation of the RI(550 nm):

$$RI(550\ nm) = \tfrac{1}{3}RI(448\ nm) + \tfrac{2}{3}RI(635\ nm)$$

Formulation Components and Properties

The present disclosure provides solvent-free, low-viscosity, high-transparency, high-RI comprising at least partially capped metal oxide nanocrystals dispersed in a monomer, oligomer, polymer or mixtures thereof. Said formulations also include, a curing agent, an adhesion promoter, a wetting agent, a leveling agent, a dispersing agent, a viscosity modifier, organic dopants and an antioxidant. These formulations make it possible to produce nanocomposites and thin film coatings with high refractive indices and high optical transparency. These formulations, specific to inkjet printing applications, shall have a strong resistance to inkjet nozzle faceplate wetting and appropriate wettability to desired substrates. A liquid wets to a specific solid surface and a contact angle forms once the liquid has reached equilibrium. Very low values of contact angle are typically less than 10o, and the liquid has high wettability with said surface. With high wettability uniform coatings can be achieved. Contact angles greater than 45o are suggestive of partially wetted or non-wetted cases. For such cases irregular surfaces and possible lens printing are possible outcomes and are often indicative of high surface tension liquids on low surface energy surfaces.

The resultant nanocomposite films shall have moderate to high degrees of cure, good adhesion to the intended substrates and good film uniformity.

Although the formulations described herein focus on the application of UV radiation for cure, thermal cure is entirely possible with appropriate thermo-initiators, such as 2,2-Azobis(2-methylpropionitrile) (AIBN).

A combination of more than one curing agent is advantageous in certain circumstances known to one of ordinary skill.

The amount of curing agent of presently disclosed formulation is present in an amount of less than 0.5% by total weight of the monomer, oligomer, and/or polymer, or 0.5%-1% by total weight of the monomer, oligomer, and/or polymer, or 1%-2% by total weight of the monomer, oligomer, and/or polymer, or 2%-3% by total weight of the monomer, oligomer, and/or polymer, or 3%-4% by total weight of the monomer, oligomer, and/or polymer, or 4%-5% by total weight of the monomer, oligomer, and/or polymer, or 5%-6% by total weight of the monomer, oligomer, and/or polymer, or 6%-7% by total weight of the monomer, oligomer, and/or polymer, or 7%-8% by total weight of the monomer, oligomer, and/or polymer, or 8%-15% by total weight of the monomer, oligomer, and/or polymer.

The adhesion promoter, if present is selected from organometallic compounds, such as organo functional silanes, or from functionalized monomers and oligomers. Some organo substrates and good film uniformity.

The nanocrystals of the present disclosure comprise nanocrystals of metal oxides, such as titanium oxide, hafnium oxide, zinc oxide, tantalum oxide, niobium oxide, or a mixture of at least two of said oxides, which have high bulk refractive indexes, typically larger than 2, as well as high transparency, due to their large bandgaps in the visible spectrum.

The capped nanocrystals of the present disclosure have an average size range of 3-40 nm, measured with Transmission Electron Microscopy (TEM) with a narrow size distribution.

The capped nanocrystals of the present disclosure are, for example, monodispersed with an average size less than 20 nm, measured with a Malvern Zetasizer Nano S Dynamic Light Scattering (DLS) instrument when dispersed in a solvent, such as PGMEA, at a concentration less than or equal to 5% by weight. The DLS measures the particle size together with the solvent shell surrounding the nanocrystal. The capped nanocrystals of present disclosure maintain dispersibility or remain agglomeration-free in a polymer or monomer matrix. Such physical characteristics of the presently disclosed materials not only reduce light scattering but also make for improved processability.

The capped nanocrystals of presented disclosure are prepared by a method described in provisional patent application 62/769,703 and U.S. Pat. No. 8,592,511 B2, entire content of which is incorporated herein as a reference.

The nanocrystals of the present disclosure are at least partially capped with specific functional group, also referred to as capping agents, or capping groups. These specific functional groups are grafted to the surface of the nanocrystals. The capping reaction is performed in the presence of water. As used herein capped nanocrystals and at least partially capped nanocrystals are functionally equivalent.

The capping agent of capped nanocrystals in the presently disclosed formulation includes silanes, carboxylic acids and/or alcohols. Examples of silanes of the present disclosure include, but are not limited to, methyltrimethoxysilane, n-propyltrimethoxysilane, n-propyltriethoxysilane, n-octyltrimethoxysilane, n-octyltriethoxysilane, phenyltrimethoxysilane, dodecyltrimethoxysilane, m,p-ethylphenethyl trimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-(acryloyloxy)propyl trimethoxysilane, 3-isocyanatopropyltriethoxysilane, 3-isocyanatopropyltrimethoxysilane, and glycidoxypropyltrimethoxysilane, vinyltrimethoxysilane, allyltrimethoxysilane, 1-hexenyltrimethoxysilane, 1-octenyltrimethoxysilane or any combination thereof.

Examples of alcohols of the present disclosure include, but are not limited to, heptanol, hexanol, octanol, benzyl alcohol, phenol, ethanol, propanol, butanol, oleylalcohol, dodecylalcohol, octadecanol and triethylene glycol monomethyl ether or any combination thereof.

Examples of carboxylic acids of the present disclosure include, but are not limited to, octanoic acid, acetic acid, propionic acid, 2-[2-(2-methoxyethoxy)ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(methacryloyloxy)ethyl succinate, or any combination thereof.

The monomer, oligomer, and/or polymer of presently disclosed formulation include acrylics, vinyls, or combinations thereof.

The acrylic monomer, oligomer, and/or polymer of presently disclosed formulation include benzyl (meth)acrylate (BA and BMA), trimethylolpropane tri(meth)acrylate (TMPTA and TMPTMA), trimethylolpropane ethoxylate tri(meth)acrylate (EOTMPTA and EOTMPTMA), 1,6-hexanediol di(meth)acrylate (HDDA and HDDMA), di(ethyleneglycol) di(meth)acrylate (DEGDA and DEGDMA), ethylene glycol diacrylate, glycerol 1,3-diglycerolate diacrylate, tri(propylene glycol) diacrylate, 1,6-hexanediol ethoxylate diacrylate, ethylene glycol phenyl ether (meth)acrylate (PEA and PEMA), 2-hydroxy-3-phenoxypropyl acrylate (HPPA), 2-hydroxy-3-phenoxypropyl methacrylate (HPPMA), 2-phenoxy benzyl acrylate (PBA), biphenyl methacrylate (BPMA), 2-phenylphenol methacrylate (PPMA), isobutyl acrylate (IBA), 2-phenylethyl acrylate (2-PEA), 2-(phenylthio)ethyl acrylate (PTEA), sulfur-containing commercial resins and adhesives such as #18109, #18165 and #6205 (NTT-AT); and LumipluS LP-1100, LPB-1102, LPJ-1102 and LPS-1130 (Mitsubishi Gas Chemical Company) or combinations thereof.

The vinyl monomer, oligomer, and/or polymer of presently disclosed formulation include N-vinyl pyrrolidone (NVP), phenyl norborene, styrene (STY), 4-methylstyrene, 4-vinylanisole, divinylbenzene or combinations thereof.

The presently disclosed formulation include mercapto functional monomers such as trimethylolpropane tri(3-mercaptopropionate) (TMPMP), pentaerythritol tetra(3-mercaptopropionate) (PETMP), ethylene glycol dimercaptopropionate, ethylene glycol dimercaptoacetate, thiodiethanethiol, bis(mercaptoethyl)ether, 2,2'-(ethylenedioxy)diethanethiol, and combinations thereof.

The presently disclosed formulation includes an organic dopant to increase the refractive index of the film or coating. The organic dopant, if present, include phenanthrene (PhA), 9-cyanophenanthrene, triphenyl methane, benzoquinoline, 9-vinylcarbazole and combinations thereof.

Curing agents of the presently disclosed formulation comprise a photopolymerization initiator. Any photopolymerization initiator, provided it doesn't limit optical and physical performance of the nanocomposite, can be used as long as it is capable of producing an active species, such as a radical with light (UV) energy. Photopolymerization initiator curing agents include amines such as Ebecryl® P115, or benzophenone and its derivatives such as Ebecryl® P39, benzophenone, SpeedCure BEM (Lambson USA Ltd, Rutherford, CT, USA) or organophosphines such as diphenyl(2,4,6-trimethylbenzoyl)-phosphine oxide (TPO), Irgacure® 819, or Irgacure® 184 (BASF USA, Florham Park, NJ, USA). The formulation comprises a single photopolymerization initiator or any combination thereof functional silane adhesion promoters that are suitable contain amino or methacryloxy groups. Exemplary silane adhesion promoters include, but are not limited to 3-aminopropyltriethoxysilane, 3-[(methacryloyloxy)propyl]trimethoxysilane, ureidopropyltrimethoxysilane, and trimethoxy [3-(methylamino)propyl] silane. Functionalized monomer and oligomer adhesion promoters include, but are not limited to, CN820, CN146 (Sartomer Americas, Exton, PA, USA), SR9051, SR9053 (Sartomer Americas, Exton, PA, USA), and Ebecryl 171 (Allnex USA Inc., Wallingford, CT, USA).

Adhesion promoters of the presently disclosed formulation is present in an amount of less than 0.5% by weight of the monomer, oligomer, and/or polymer, or 0.5-1% by weight of the monomer, oligomer, and/or polymer, or 1-5% by weight of the monomer, oligomer, and/or polymer, or 5-10% by weight of the monomer, oligomer, and/or polymer, or 10-15% by weight of the monomer, oligomer, and/or polymer, or 15-30% by weight of the monomer, oligomer, and/or polymer.

A surfactant, which acts as a wetting agent, leveling agent, defoaming agent and dispersing agent is optionally present to reduce the surface tension of the formulation and thereby improve the flow properties of the formulation to produce a more uniform dried coating surface. The surfactant may be non-ionic, anionic, or a combination thereof. Representative examples of suitable wetting agents include but are not limited to siloxane surfactants such as BYK-331, BYK-377, BYK-378, (BYK Chemie, GMBH) and fluoro-surfactants such as Novec 4430, Novec 4432, and Novec 4434 (3M, St. Paul, MN, USA), and Capstone FS-3100 (The Chemours Company, Wilmington, DE, USA). A leveling agent is optionally used. Examples of leveling agents include a polyacrylate compound such as BYK-352, BYK-353, BYK-356, and BYK-361N; an aralkyl modified polymethylalkylsiloxane, such as BYK-322, BYK-323, and BYK-350 (BYK Chemie, GMBH) and a polyether-modified, acryl functional siloxane, such as BYK-UV3530. Examples of the dispersing agent include, without limitation, polyalkylene glycols and esters thereof, polyoxyalkylenes, polyhydric alcohol ester alkylene oxide addition products, alcohol alkylene oxide addition products, sulfonate esters, sulfonate salts, carboxylate esters, carboxylate salts, alkylamide alkylene oxide addition products, alkyl amines, and the like, and are used singularly or as a mixture of two or more. Commercially available examples of the dispersing agent include without limitation DISPERBYK-101, DISPERBYK-130, DISPERBYK-140, DISPERBYK-160, DISPERBYK-161, DISPERBYK-162, DISPERBYK-163, DISPERBYK-164, DISPERBYK-165, DISPERBYK-166, DISPERBYK-170, DISPERBYK-171, DISPERBYK-182, DISPERBYK-2000, DISPERBYK-2001 (BYK Chemie, GMBH), Solsperse 32000, Solsperse 36000, Solsperse 28000, Solsperse 20000, Solsperse 41000, and Solsperse 45000 (Lubrizol, Wickliffe, OH, USA).

The amount of surfactant of the presently disclosed formulation, for the purpose of improving wetting properties, is present in amount of less than 0.05% by weight of the total formulation, or 0.05-0.1% by weight of the total formulation, or 0.1-0.5% by weight of the total formulation, or 0.5-1% by weight of the total formulation, or 1-2% by weight of the total formulation, or 2-5% by weight of the total formulation. For the purposes of aiding in dispersion the amount of surfactant of the presently disclosed formulation varies depending on the material being dispersed. The amount of dispersing agent is less than 3% by weight of the material being dispersed or 3-5% by weight of the material being dispersed, or 5-10% by weight of the material being dispersed, or 10-20% by weight of the material being dispersed, or 20-40% by weight of the material being dispersed, or 40-60% by weight of the material being dispersed, or 60-80% by weight of the material being dispersed, or 80-100% by weight of the material being dispersed, or 100-150% by weight of the material being dispersed.

Antioxidant agents of the presently disclosed formulation include at least one primary antioxidant. This primary antioxidant comprise sterically hindered phenols, such as Irganox 1010, Irganox 1076, SongNox® 1076, SongNox® 2450 or phenolic phosphites such as SongNox® 1680 or phosphines such as Irgaphos 168 (BASF USA, Florham Park, NJ, USA) or aromatic secondary amines or hindered amines such as SongLight® 6220 (Songwon Americas, Friendwood, TX, USA).

Formulations of the present disclosure comprise at least one secondary antioxidant. This secondary antioxidant is preferably chosen from compounds comprising at least one unit formed from a sulfur atom linked to two carbon atoms. Representative examples of the secondary antioxidant are di(t-butyl) hydroxyphenylamino bisoctylthiotriazine and Irganox PS800 (BASF USA, Florham Park, NJ, USA).

The amount of anti-oxidant of presently disclosed formulation is less than 0.5% by weight of the total formulation, or 0.5%-1% by weight of the total formulation, or 1%-2% by weight of the total formulation, or 2%-3% by weight of the total formulation, or 3%-4% by weight of the total formulation, or 4%-5% by weight of the total formulation, or 5%-6% by weight of the total formulation, or 6%-7% by weight of the total formulation, or 7%-8% by weight of the total formulation or 8%-10% by weight of the total formulation.

The presently disclosed formulation further comprises, plasticizer, toughener, thickener, thinner, dispersant, or flexibilizer, or other functional additives.

The presently disclosed formulation further comprise solvent in small concentrations for maintaining lower viscosities (within the definitions of "solvent-free" and "solvent-less"). The choice of solvent depends entirely on the capped nanocrystal type and selected monomers, oligomers and polymers of the formulation. Examples of common solvents that range from low to high boiling point are alcohols, glycols, methyl acetates, ethyl acetates, esters, ketones, glycol ethers, glycol esters, such as propylene glycol monomethyl ether acetate (PGMEA), propylene glycol monomethyl ether (PGME), ethylene glycol monobutyl ether acetate, diethylene glycol monobutyl ether acetate, diethylene glycol butyl ether, diethylene glycol monoethyl ether acetate, dipropylene glycol methyl ether acetate, butoxy ethanol, butoxy propanol, ethoxy ethyl acetate, butoxy ethyl acetate, 2-(isopentyloxy)ethanol, 2-(hexyloxy)ethanol, diethylene glycol, diethylene glycol monomethyl ether, diethylene glycol monoethyl ether, triethylene glycol, triethylene glycol monomethyl ether, dipropylene glycol, dipropylene glycol monomethyl ether, and dipropylene glycol monoethyl ether, ethyl acetate, THF, acetone, any combination thereof.

Formulations of present disclosure displays a tunable viscosity, and/or a viscosity that is controlled by one or more of components of the formulation. Parameters that control viscosity of the formulation include, but are not limited to, the average length, and molecular weight, of a monomer, oligomer, and/or polymer; as well as the presence of a solvent and the concentration of a solvent, the presence of a thickener (i.e., a viscosity-modifying component) and the concentration of a thickener, the particle size of a component present in the formulation, temperature, and combinations thereof.

The presently disclosed formulation is stable for more than 1 week, or more than 2 weeks, or more than 3 weeks, or more than 6 weeks, or more than 8 weeks, or more than 3 months, or more than 6 months, or more than 12 months, or more than 36 months, with no significant increase in viscosity. There should be no visible precipitation of capped nanocrystals, and the change in formulation viscosity should be less than 10%, or less than 20%, or less than 30%, or less than 40%, or less than 50%, or less than 100%. Furthermore, the change in the optical transmittance of the formulations should be less than 10% decrease in transmittance, or less than 20% decrease in transmittance, or less than 30% decrease in transmittance, or less than 40% decrease in transmittance, or less than 50% decrease in transmittance at 450 nm.

For the purposes of inkjet printing the jetting of the presently disclosed formulation is stable for more than 1 hour, for more than 8 hours, for more than 1 day, or more than 1 week with no significant increase in viscosity. The formulation does not solidify by way of drying or curing leading to clogging of printhead nozzles.

Methods of Making a Solvent-Free or Solvent-Less Formulation

In some embodiments, the disclosure provides a method of making a solvent-free nanocomposite formulation comprising a direct dispersion (directly dispersing nanocrystals in a media), method wherein capped nanocrystals are separated from a solvent and dried under vacuum until the solvent content is less than 5% to form dry nanocrystals; mixing dry nanocrystals of at least partially capped metal oxide nanocrystals in at least one monomer, oligomer, polymer or mixtures thereof by soaking, stirring, speed mixing, microfluidizing or other mixing methods. In additional embodiments, the method further comprises filtering said mixture to remove aggregates or other contaminants.

In some embodiments, the disclosure provides a method of making a solvent free formulation comprising mixing dry powder of at least partially capped metal oxide nanocrystals in at least one solvent by soaking, stirring, speed mixing, microfluidizing or other mixing methods to provide a nanocrystal solvent dispersion; mixing said dispersion with at least one monomer, oligomer, polymer or mixtures or monomers, oligomers and/or polymers to provide a solvent containing formulation; removing said solvent by evaporation or other solvent removal methods such as rotovap. In additional embodiments, the method further comprises filtering said solvent containing or solvent free formulation to remove aggregates or other contaminants. In some embodiments, the solvents used according to the method include, ethyl acetate, methyl ethyl ketone, or other low boiling point solvents.

Nanocomposite Properties

A nanocomposite comprising a film, coating, layer, lens on a substrate or free-standing. The present disclosure provides a nanocomposite comprising a mixture of an organic polymerizable matrix, a curing agent, and capped nanocrystals wherein said capped nanocrystals are present in the nanocomposite in the amount of 20-80% by weight of the nanocomposite. A more refined loading for inkjet-printable formulations is 30-70% by weight and is highly dependent on the selection of monomers, oligomers, polymers and solvent, if any.

The presently disclosed nanocomposite comprises nanocrystals of metal oxides, such as titanium oxide, hafnium oxide, zinc oxide, tantalum oxide, niobium oxide or a mixture of at least two of said oxides.

The capping agent of capped nanocrystals in the presently disclosed nanocomposite include silanes, carboxylic acids and/or alcohols. Examples of silanes of the present disclosure include, but are not limited to, methyltrimethoxysilane, n-propyltrimethoxysilane, n-propyltriethoxysilane, n-octyltrimethoxysilane, n-octyltriethoxysilane, phenyltrimethoxysilane, dodecyltrimethoxysilane, m,p-ethylphenethyl trimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-(acryloyloxy)propyl trimethoxysilane, 3-isocyanatopropyltriethoxysilane, 3-isocyanatopropyltrimethoxysilane, and glycidoxypropyltrimethoxysilane, vinyltrimethoxysilane, allyltrimethoxysilane, 1-hexenyltrimethoxysilane, 1-octenyltrimethoxysilane or any combination thereof.

Examples of alcohols of the present disclosure include, but are not limited to, heptanol, hexanol, octanol, benzyl alcohol, phenol, ethanol, propanol, butanol, oleylalcohol, dodecylalcohol, octadecanol and triethylene glycol monomethyl ether or any combination thereof.

Examples of carboxylic acids of the present disclosure include, but are not limited to, octanoic acid, acetic acid, propionic acid, 2-[2-(2-methoxyethoxy)ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(Methacryloyloxy)ethyl succinate, or any combination thereof.

The inorganic solid content of the presently disclosed nanocomposite coating or film is analyzed using a TA instrument Q500 thermal gravimetric analyzer (TGA). The procedure is the same as described previously.

The inorganic solid content of the presently disclosed nanocomposite coating in in the range of 0-10% as measured by TGA, or 10-20% as measured by TGA, or 20-30% as measured by TGA, or 30-40% as measured by TGA, or 40-50% as measured by TGA, or 50-60% as measured by TGA, or 60-70% as measured by TGA, or 70-80% as measured by TGA, or 80-90% as measured by TGA, or 90-93% as measured by TGA.

The monomer units of the polymer matrix of the presently disclosed nanocomposite coating or film include acrylics. The monomer units of the polymer matrix of the presently disclosed nanocomposite coating or film include benzyl methacrylate (BMA), benzyl acrylate (BA), trimethylolpropane triacrylate (TMPTA), trimethylolpropane trimethacrylate (TMPTMA), trimethylolpropane ethoxylate triacrylate (EOTMPTA), trimethylolpropane ethoxylate trimethacrylate (EOTMPTMA), 1,6-hexanediol diacrylate (HDDA), 1,6-hexanediol dimethacrylate (HDDMA), di(ethyleneglycol) diacrylate (DEGDA), di(ethyleneglycol) dimethacrylate (DEGDMA), ethylene glycol diacrylate, glycerol 1,3-diglycerolate diacrylate, tri(propylene glycol) diacrylate, 1,6-hexanediol ethoxylate diacrylate, ethylene glycol phenyl ether acrylate (PEA), ethylene glycol phenyl ether methacrylate (PEMA), 2-hydroxy-3-phenoxypropyl acrylate (HPPA), 2-hydroxy-3-phenoxypropyl methacrylate (HPPMA), 2-phenoxy benzyl acrylate (PBA), biphenyl methacrylate (BPMA), 2-phenylphenol methacrylate (PPMA), isobutyl acrylate (IBA), or any combination thereof.

The presently disclosed nanocomposite possesses a refractive index of 1.54-1.56, 1.56-1.58, 1.58-1.60, 1.60-1.62, or 1.62-1.64, 1.64-1.66, or 1.66-1.68, or 1.68-1.70, or 1.70-1.72, or 1.72-1.74, or 1.76-1.78, or 1.78-1.80, or 1.80-1.82, or 1.82-1.84, or 1.84-1.86, or 1.86-1.88, or 1.88-1.90, or 1.90-1.92 or 1.92-1.94 at 550 nm.

The presently disclosed nanocomposite additionally demonstrates pencil hardness 2H or higher, 3H or higher, or 4H or higher, or 5H or higher, or 6H or higher. When tested using ASTM D3363 method.

The presently disclosed nanocomposite possesses high optical (400-800 nm) transmittance of 99.9%-99%, or 99%-98%, or 98%-97%, or 97%-96%, or 96%-95%, or 95%-90%, or 90%-85%, or 85%-80%, 80%-75%, or 75%-70%, or 70%-65%, or 65%-60%, or 60%-55%, or 55%-50%, or 50%-45%, or 45%-40%, or 40%-35%, or 35%-30%, or 30%-25%, or 25%-20%, or 20%-15%, or 15%-10% for films that are less than 20 microns thick. The transmittance of a film according to the present disclosure comprise normal transmittance measured with a Perkin-Elmer UV-Vis Lambda 850 spectrophotometer, wherein the nanocomposite is coated on an optically transparent substrate, such as fused silica or glass substrates, and a blank substrate of the same type and thickness is used as a reference.

The presently disclosed nanocomposite additionally demonstrates thermal stability at temperatures above 120° C., or above 175° C., or above 200° C., or above 250° C., or above 260° C., or above 300° C. The thermal stability is measured by subjecting the nanocomposite at designated temperature in air, nitrogen, or under vacuum for 5 minutes or longer, or 10 minute or longer, or 30 minutes or longer, or 60 minutes or longer, or 120 minutes or longer, without visually observable coloration, cracking, or delamination and less than 10% decrease in transmittance, or less than 20% decrease in transmittance, or less than 30% decrease in transmittance, or less than 40% decrease in transmittance, or less than 50% decrease in transmittance at 400 nm.

A Method of Making a Nanocomposite

The present disclosure provides a method of making a nanocomposite using the presently disclosed formulation. A nanocomposite film is described herein containing a cured or partially cured formulation of the present disclosure. Said nanocomposite is cured or partially cured by UV or thermal curing techniques known to one of ordinary skill in the art.

The present disclosure provides a nanocomposite film as described herein wherein the film is produced by applying the formulation on a surface by spin coating, slot-die coating, screen-printing, ink-jet printing, nanoimprinting, photopatterning, 3D printing, dip coating, draw-bar coating, roll-to-roll printing, spray coating, dispensing, volume casting, screen printing and any combination thereof.

Devices

The present disclosure provides a device comprising an active component, said active component comprising or containing a nanocomposite of the present disclosure. Devices comprising smart windows, sensors, CMOS sensors, LED, mini-LED, microLED, organic LED (OLED), Quantum LED (QLED), touch screen, display, flexible electronics, printed electronics, self-cleaning surfaces, Augmented Reality (AR), Mixed Reality (MR), and Virtual Reality (VR), wave guides, light extraction, and 3D sensors.

EXAMPLES

Example 1

The capped ZrO2 nanocrystals as described above in the embodiments were dispersed via direct dispersion (See Section 1 of Methods of Making A Solvent-free or Solventless Formulation) into desired monomers, such as BA or PEA and diluted with crosslinkers, such as TMPTA, HDDA and TMPMP to desired loadings of zirconia in the formulation ranging from 35 wt %-70 wt %, BA weight percent ranging from 4-20 wt %, PEA weight percent ranging from 20-40 wt %, TMPTA weight percent ranging from 2-5 wt %, TMPMP weight percent ranging from 3-5 wt %, HDDA weight percent ranging from 1-3 wt %, and BYK 378 weight percent ranging from 0.5-1.0 wt %. Representative formulations of Example 1 are labeled Formulations A1 through A10 according to Table 1 below:

TABLE 2

| Formulation | ZrO$_2$ (wt %) | PEA (wt %) | BA (wt %) | TMPTA (wt %) | HDDA (wt %) | TMPMP (wt %) | Viscosity (cP) |
|---|---|---|---|---|---|---|---|
| A1 | 50.00 | 40.00 | 0.00 | 5.00 | 0.00 | 5.00 | 62.7 |
| A2 | 50.00 | 36.00 | 4.00 | 5.00 | 0.00 | 5.00 | 47.4 |
| A3 | 50.00 | 28.00 | 12.00 | 5.00 | 0.00 | 5.00 | 34.7 |
| A4 | 50.00 | 20.00 | 20.00 | 5.00 | 0.00 | 5.00 | 26.0 |
| A5 | 50.00 | 20.00 | 20.00 | 3.75 | 1.25 | 5.00 | 25.0 |
| A6 | 50.00 | 20.00 | 20.00 | 2.50 | 2.50 | 5.00 | 23.6 |
| A7 | 50.00 | 21.25 | 21.25 | 3.75 | 0.00 | 3.75 | 23.4 |
| A8 | 45.00 | 23.40 | 23.40 | 4.10 | 0.00 | 4.10 | 16.9 |
| A9 | 40.00 | 25.50 | 25.50 | 4.50 | 0.00 | 4.50 | 13.8 |
| A10 | 35.00 | 27.60 | 27.60 | 4.90 | 0.00 | 4.90 | 11.5 |

Example 1A

A photoinitiator (Irgacure® 819 photoinitiator) was added in an amount of 4 wt % relative to monomer content to the Formulation A10 having 35 wt % capped of the capped ZrO2 nanocrystals in a blend of acrylates consisting of 27.6 wt % BA, 27.6 wt % PEA, 4.9 wt % TMPTA and 4.9 wt % TMPMP exhibiting a viscosity of 11.5-cP viscosity. Formulation A10 with the added photoinitiator was then deposited as a film having a thickness of 10 microns onto a glass substrate. The film was cured under 385 nm UV light at 1 J/cm2 and resulted in a cured film having a refractive index of 1.58 at 550 nm.

Example 2

The capped nanocrystals of ZrO2 used in Example 1 were dispersed into benzyl acrylate (BA) monomer in the same manner previously described to achieve several weight percentages of nanocrystal loadings (NC wt %) to form nanocomposites. A siloxane surfactant (BYK 378 commercially available from BYK Chemie, GMBH) was added in an amount of 1.0 wt % to form the other. The capped nanocrystal weight percent ranged from 35-70 wt %, with BA weight percent ranging from 35-70 wt %, and BYK 378 weight percent ranging from 0.5-1.0 wt % with respect to total formulation.

Figure 2:
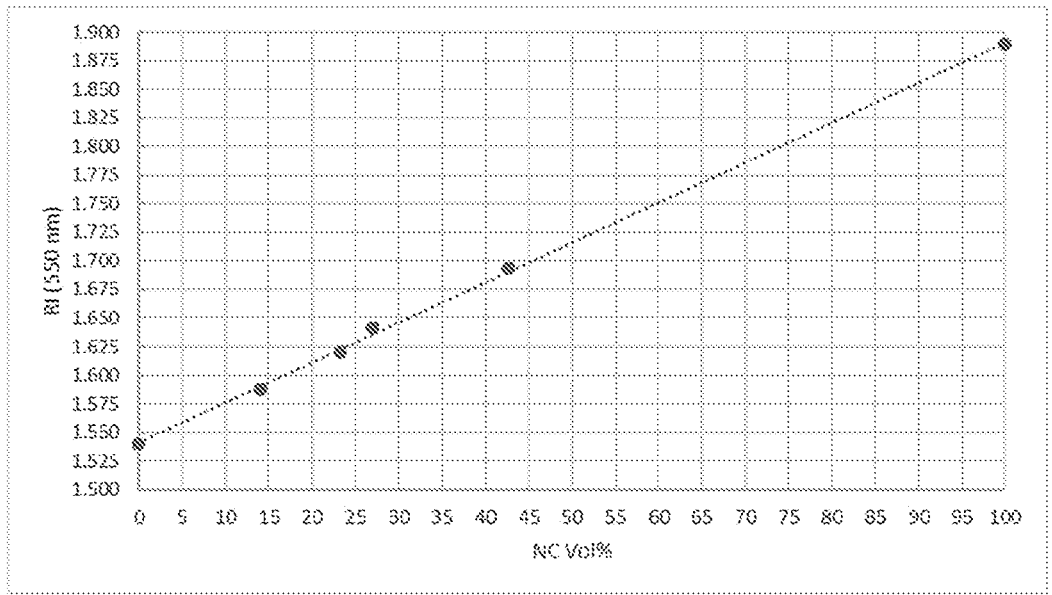
FIG. 2 shows exemplary the refractive index at 550 nm for cured film as a function of volume percent of capped zirconia in BA as described in EXAMPLE 2.
Figure 3:
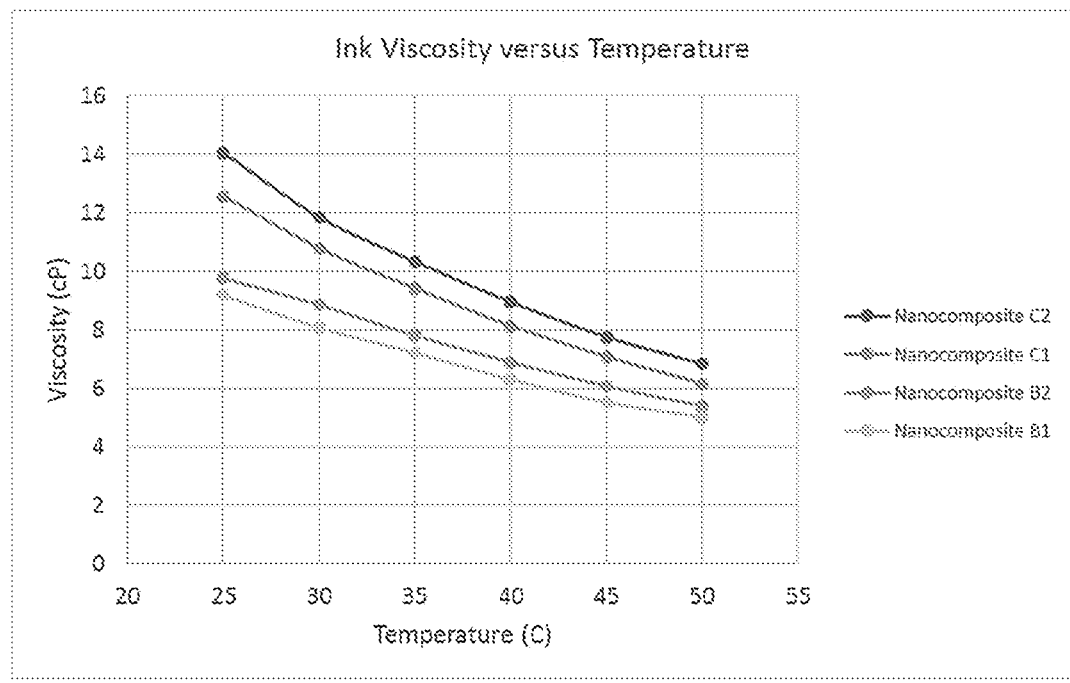
FIG. 3 shows exemplary viscosity versus temperature behavior of formulations with different weight percent of capped zirconia in monomer blends with and without surfactant as described in EXAMPLEs 2 and 3.

Nanocomposite B1 and B2 comprise 50 wt % (23.3 vol %) nanocrystals in BA without and with 1 wt % BYK 378 surfactant, respectively. FIG. 1 shows the behavior of the uncured formulation B1 viscosity at 25 C in relation to the weight percent of zirconia nanoparticles. Nanocomposite B1 at 50 wt % nanocrystals has a nanocomposite formulation viscosity of 10 cP. FIG. 2 represents the cured B1 film RI at 550 nm (calculated from measurements made at 448 and 635 nm) versus the volume percent of zirconia nanoparticles for a formulation depicted in this example. Nanocomposite B1 at 50 wt % nanocrystals has a nanocomposite film RI at 550 nm of 1.624. Viscosity versus temperature behavior is an important relationship for certain inkjet printhead. FIG. 3 displays the viscosity-temperature relationship for uncured formulations of Nanocomposites B1 and B2 with two other nanocomposites described in Example 3 for comparison. The viscosities of Nanocomposites B1 and B2 decrease from approximately 9.1-9.8 cP at 25 C to 5.0-5.2 cP at 50 C.

Example 3

Figure 4:
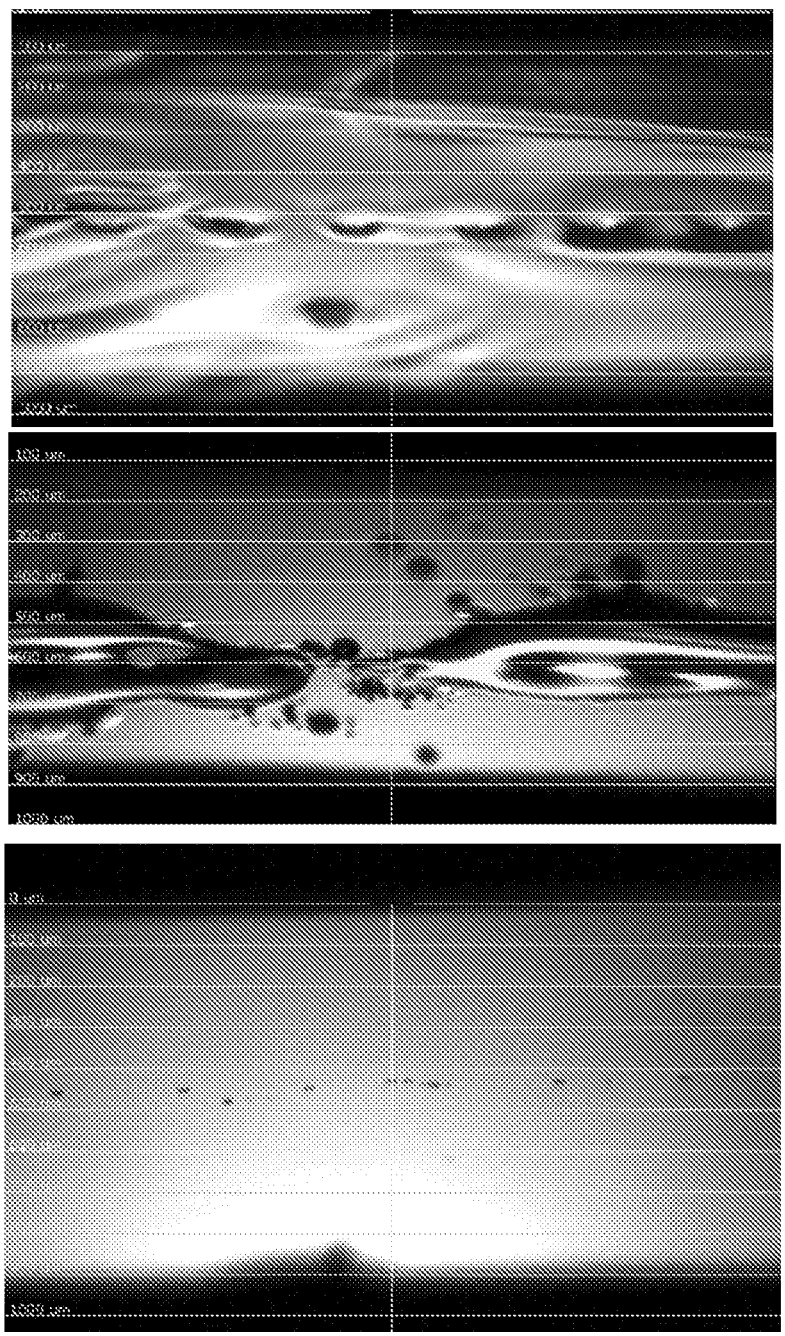
FIG. 4 has pictures of varying degrees of nozzle plate wetting on Fujifilm Dimatix DMC cartridge nozzle plate: severe (top), moderate (middle) and little to no (bottom).

The capped nanocrystals of ZrO2 used in Example 1 were dispersed into the desired monomer blends, such as BA, NVP and PBA with surfactant, such as BYK 378, to desired loadings of zirconia in the formulation ranging from 30 to 70 wt %. Preferred capped nanocrystal weight percent ranges from 35-60 wt %, BA weight percent ranges from 15-30 wt %, NVP weight percent ranges from 5-20 wt %, PBA weight percent ranges from 5-20 wt %, and BYK 378 weight percent ranges from 0.5-1.0 wt % with respect to total formulation. The combination of PBA and BYK 378 will result in little to no nozzle plate wetting for specific inkjet printheads, e.g. Dimatix DMC and KM1024i HE series. FIG. 4 demonstrates three pictures as examples of nozzle plate wetting ranging from severe wetting (top) to moderate (middle) to none (bottom).

Example 3A

A specific example is a formulation with 40 wt % capped nanocrystals in a blend of acrylates consisting of 30.0 wt % BA, 30.0 wt % PBA, BYK 378 (Nanocomposite C1—without BYK 378; Nanocomposite C2—with 1.0 wt % BYK 378 (with respect to total formulation) and nanocomposite C2 has a 14.2-cP viscosity at 25 C and 22.0 dyne/cm surface tension. Irgacure 819 photoinitiator is added at 4 wt % (with respect to the monomer content) to the C2 formulation, and it is deposited as a film. 10-micron films were coated of each formulation on a glass substrate is cured under 385 nm UV at 1 J/cm2 and has a refractive index of 1.64 at 550 nm. The resulting films are Nanocomposites C1 and C2. The viscosity versus temperature relationship for the formulations of Nanocomposites C1 and C2 are shown in FIG. 3. The viscosities of Nanocomposites B1 and B2 decrease from approximately 12.5-14.0 cP at 25 C to 6.1-7.0 cP at 50 C.

Example 3B

Another example is a formulation with 45 wt % capped nanocrystals in a blend of acrylates consisting of 27.5 wt % BA, 16.5 wt % NVP, 11.0 wt % PBA, BYK 378 (Nanocomposite D1—without BYK 378; Nanocomposite D2—with 1.0 wt % BYK 378 with respect to total formulation and the nanocomposite D2 has a 10.1-cP viscosity at 25 C and 22.0 dyne/cm surface tension.

Figure 5:
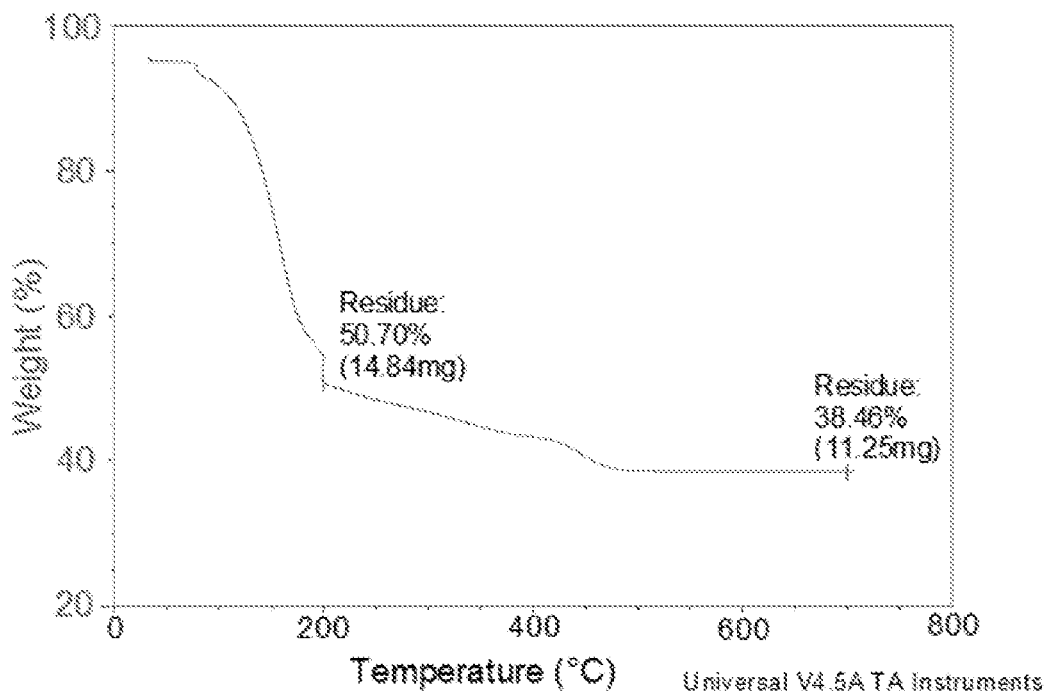
FIG. 5 is the TGA curve that results from heating the formulation Nanocomposite D3 described in EXAMPLE 3B.
Figure 6:
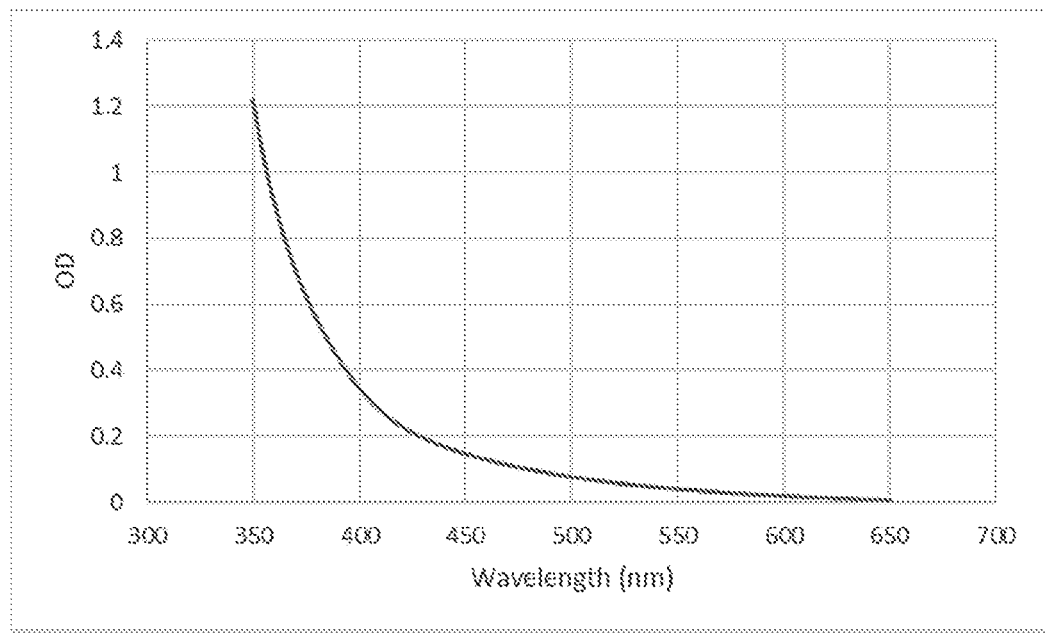
FIG. 6 is the Optical Density (OD) of Nanocomposite D3 as a formulation described in EXAMPLE 3B.

A TGA scan is used to characterize the percent solids in the formulations and is described on page 11. Another characterization tool utilizes UV-Vis spectra to determine the optical density of the uncured formulations and is described on page 12. FIGS. 5 and 6 show graphs of a TGA scan and the optical density versus wavelength curve of the Nanocomposite D2, respectively. The TGA scan shows a residual amount after 700 C heating of 38.46%. The optical density (OD) values at 350 and 450 nm are approximately 1.20 and 0.15, respectively.

Irgacure 819 photoinitiator is added at 4 wt % (with respect to the monomer content) to the Nanocomposite D2, and it is deposited as a film. The 10-micron film coated on a glass substrate is cured under 385 nm UV at 1 J/cm2 and has a refractive index of 1.64 at 550 nm.

Another example is a formulation with 50 wt % capped nanocrystals in a blend of acrylates consisting of 25.0 wt % BA, 15.0 wt % NVP, 10.0 wt % PBA, and 1.0 wt % BYK 378 is added to this mixture to form Nanocomposite D3 and has a 14.2-cP viscosity at 25 C and 22.0 dyne/cm surface tension. Irgacure 819 photoinitiator is added at 4 wt % (with respect to the monomer content) to the formulation, and it is deposited as a film. The film is cured under 385 nm UV at 1 J/cm2 and has a refractive index of 1.651 at 550 nm.

Figure 7:
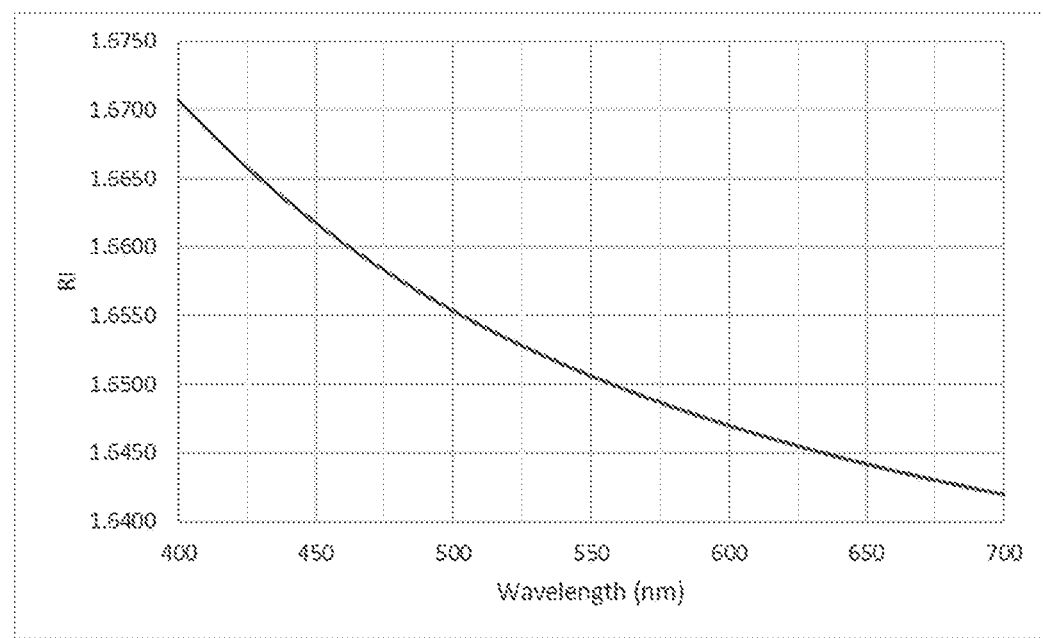
FIG. 7 displays refractive index versus wavelength curve for a cured film of Nanocomposite D3 described in EXAMPLE 3B.
Figure 8:
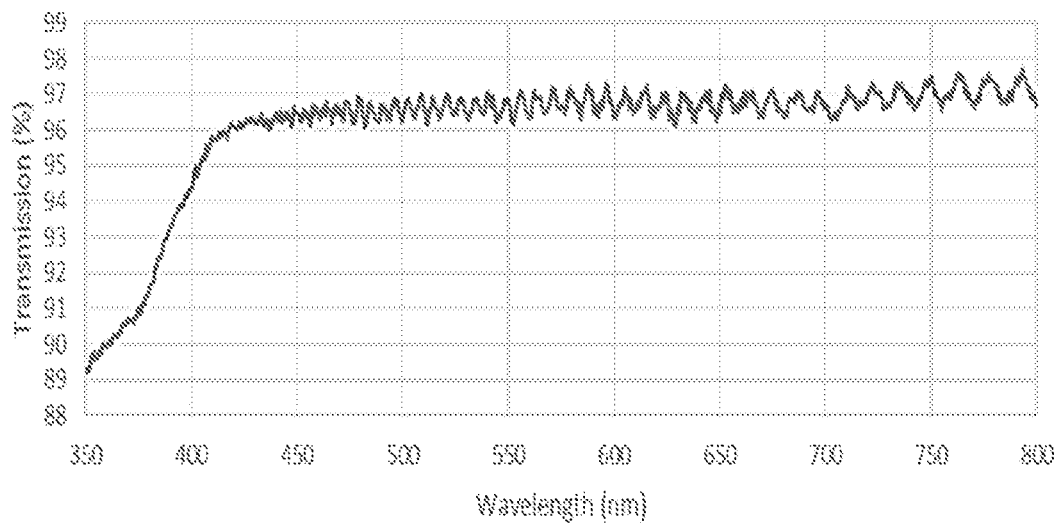
FIG. 8 displays % T versus wavelength curve for a 10-micron cured film of Nanocomposite D3 described in EXAMPLE 3B.

Typical optical properties of cured nanocomposite films are the transmission and refractive index over the visible range of wavelengths (400 to 700 nm). FIGS. 7 and 8 are the refractive index vs wavelength and % T versus wavelength curves for 10 um thick Nanocomposite D3 film with a 1.651 film RI and 96.5% transmission at 550 nm. Table 3 gives the compositions, formulation viscosity, nanocomposite film RI and nozzle wetting behavior of various formulations including Nanocomposites D2 and D3.

TABLE 3

| Nanocomposite* | ZrO$_2$ (wt %) | BA (wt %) | NVP (wt %) | PBA (wt %) | BPMA (wt %) | Formulation Viscosity (cP) | RI (550 nm) | Observed Nozzle Plate Wetting |
|---|---|---|---|---|---|---|---|---|
| D2 | 45.0 | 27.5 | 16.5 | 11.0 | 0.0 | 10.1 | 1.640 | No |
| D3 | 50.0 | 25.0 | 15.0 | 10.0 | 0.0 | 14.3 | 1.651 | No |
| D4 | 55.0 | 22.5 | 13.5 | 9.0 | 0.0 | 19.5 | 1.661 | No |
| D5 | 60.0 | 20.0 | 12.0 | 8.0 | 0.0 | 31.5 | 1.670 | No |
| E1 | 40.0 | 0.0 | 30.0 | 0.0 | 30.0 | 19.5 | 1.645 | Yes |
| E2 | 45.0 | 0.0 | 27.5 | 27.5 | 0.0 | 19.5 | 1.635 | No |
| E3 | 40.0 | 0.0 | 30.0 | 6.0 | 24.0 | 17.3 | 1.642 | Yes |
| E4 | 40.0 | 30.0 | 0.0 | 24.0 | 6.0 | 15.1 | 1.624 | No |
| E5 | 40.0 | 0.0 | 30.0 | 18.0 | 12.0 | 17.0 | 1.637 | Yes |
| E6 | 40.0 | 18.0 | 12.0 | 18.0 | 12.0 | 17.6 | 1.643 | No |

*All nanocomposites have 1 wt % BYK 378 relative to the total formulation

Example 4

The capped nanocrystals of ZrO2 used in Example 1 were dispersed into the desired monomer blends, such as BA, NVP, PBA and BPMA with surfactant, such as BYK 378, in the same manner previously described to desired loadings of zirconia in the formulation ranging from 30 to 70 wt %. Preferred capped nanocrystal weight percent ranges from 35-60 wt %, BA weight percent ranges from 15-30 wt %, NVP weight percent ranges from 5-20 wt %, PBA weight percent ranges from 5-20 wt %, BPMA weight percent ranges from 10-30 wt %, and BYK 378 weight percent ranges from 0.5-1.0 wt %. Table 3 includes compositions, viscosities, cured film RI and observations of nozzle plate wetting for Nanocomposites E1 through E6 from this example.

Example 4A

A specific example is Nanocomposite E6 which is a formulation with 40 wt % capped nanocrystals in a blend of acrylates consisting of 18.0 wt % BA, 12.0 wt % NVP, 18.0 wt % PBA, 12.0 wt % BPMA and 1.0 wt % BYK 378 and has a 17.6-cP viscosity at 25 C and 22.0 dyne/cm surface tension.

Irgacure 819 photoinitiator is added at 4 wt % (with respect to the monomer content) to the formulation, and it is deposited as a 10-micron film on a glass substrate. The film is cured under 385 nm UV at 1 J/cm2 and has a refractive index of 1.643 at 550 nm.

Example 5

The capped ZrO2 nanocrystals used in Example 1 were dispersed, in the same manner previously described into desired monomer blends, such as BA, NVP, PBA and BPMA with surfactant, such as BYK 378 to desired loadings of zirconia in the formulation with added solvent, such as PGMEA, for viscosity reduction. Preferred small additions of PGMEA are from 1-10 wt % of the total formulation to provide solvent-free and solvent-less formulations as described in this invention.

Example 5A

Figure 9:
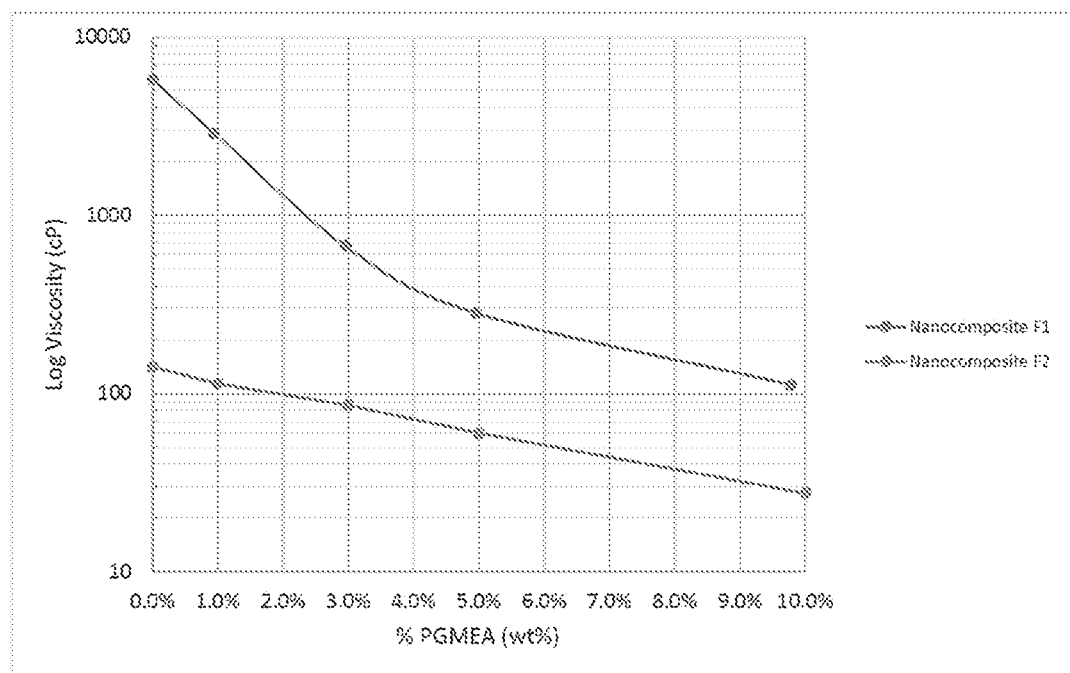
FIG. 9 shows viscosity at 25 C versus added PGMEA weight percent to Nanocomposite F1 and F2, described in EXAMPLE 5A, at different viscosities to illustrate the dilution effect.

Two specific examples are Nanocomposites F1 with 80 wt % capped nanocrystals in 20 wt % PEA which has an initial viscosity of 5,755 cP at 25 C, and Nanocomposite F2 with 75 wt % capped nanocrystals in 25 wt % BA which has an initial viscosity of 140.6 cP at 25 C. FIG. 9 displays the viscosity decrease with the addition of PGMEA with respect to the total formulation to Nanocomposites F1 and F2 to around 100 and 30 cP at 10% dilution, respectively.

Example 6

The capped ZrO2 nanocrystals used in Example 1 were dispersed in the same manner previously described into desired monomer blends, such as BA, NVP, PBA and BPMA with surfactant, such as BYK 378 to desired loadings of zirconia in the formulation and the addition of organic dopants, such as phenanthrene (PhA). Preferred capped nanocrystal weight percent ranges from 35-60 wt %, BA weight percent ranges from 15-30 wt %, NVP weight percent ranges from 5-20 wt %, PBA weight percent ranges from 5-15 wt %, BPMA weight percent ranges from 10-30 wt %, PhA weight percent ranges from 10-20 wt % with respect to monomer content, and BYK 378 weight percent ranges from 0.5-1.0 wt % with respect to total formulation. Table 4 shows compositions, formulation viscosities and nanocomposite film RI for various materials with and without PhA additions. Table 4 shows examples of Nanocomposites D3, D4, D5, G1 and G2.

Example 6A

A specific example, Nanocomposite G1, is a formulation with 50 wt % capped nanocrystals in a blend of acrylates consisting of 20.3 wt % BA, 12.2 wt % NVP, 8.2 wt % PBA, and 9.3 wt % PhA and has an 18.1-cP viscosity at 25 C.

Irgacure 819 photoinitiator is added at 4 wt % (with respect to the monomer content) to the formulation, and it is deposited as a 10-micron film on a glass substrate. The film is cured under 385 nm UV at 1 J/cm2 and has a refractive index of 1.668 at 550 nm.

Another example, Nanocomposite G2, is a formulation with 59.7 wt % capped nanocrystals in a blend of acrylates consisting of 16.6 wt % BA, 10.0 wt % NVP, 7.0 wt % PBA, and 6.6 wt % PhA and has a 42.2-cP viscosity at 25 C.

Irgacure 819 photoinitiator is added at 4 wt % (with respect to the monomer content) to the formulation, and it is deposited as a film. The film is cured under 385 nm UV at 1 J/cm2 and has a refractive index of 1.683 at 550 nm.

TABLE 4

| Nanocomposite* | $ZrO_2$ (wt %) | BA (wt %) | NVP (wt %) | PBA (wt %) | PhA (wt %) | Viscosity (cP) | RI (550 nm) |
|---|---|---|---|---|---|---|---|
| D3 | 50.0 | 25.0 | 15.0 | 10.0 | 0.0 | 14.3 | 1.651 |
| G1 | 50.0 | 20.3 | 12.2 | 8.2 | 9.3 | 18.1 | 1.668 |
| D4 | 55.0 | 22.5 | 13.5 | 9.0 | 0.0 | 19.5 | 1.661 |
| D5 | 60.0 | 20.0 | 12.0 | 8.0 | 0.0 | 31.5 | 1.670 |
| G2 | 59.7 | 16.6 | 10.0 | 7.0 | 6.6 | 42.2 | 1.683 |

*All nanocomposites have 1 wt % BYK 378 relative to the total formulation

Example 7

The capped ZrO2 nanocrystals used in Example 1 were dispersed in the same manner previously described into desired monomer blends, such as BA, NVP, PBA, STY, and/or 4-methylstyrene (4MS), divinylbenzene (DVB) and 4-vinylanisole (4VA) and the addition of organic dopants, such as 9-vinylcarbazole (NVCb) to form nanocomposites H1-H5. Optionally surfactants, such as BYK 333, and dispersants, such as FLOWLEN G-700 were added to improve inkjet performance. Preferred capped nanocrystal weight percent ranges from 35-60 wt %, BA weight percent ranges from 15-30 wt %, NVP weight percent ranges from 5-20 wt %, PBA weight percent ranges from 5-15 wt %, STY weight percent ranges from 10-20 wt %, DVB weight percent ranges from 10-20 wt %, 2-PEA weight percent ranges from 2-30 wt %, NVCb weight percent ranges from 5-35 wt % with respect to monomer content, BYK 333 weight percent ranges from 0.01-1.0 wt %, and FLOWLen G-700 dispersant weight percent ranges from 0.01-1.0 wt %. Table 5 shows compositions, formulation viscosities and nanocomposite RI for various materials with and without STY, 4MS, DVB, 4VA, 2-PEA and NVCb additions.

TABLE 5

| Nanocomposite* | ZrO$_2$ (wt %) | BA (wt %) | NVP (wt %) | PBA (wt %) | STY (wt %) | 4MS (wt %) | DVB (wt %) | 4VA (wt %) | NVCb (wt %) | Viscosity (cP) | RI (550 nm) |
|---|---|---|---|---|---|---|---|---|---|---|---|
| H1 | 47.5 | 13.0 | 7.9 | 5.2 | 4.8 | 0.0 | 0.0 | 0.0 | 16.6 | 21.3 | 1.690 |
| H2 | 47.5 | 13.0 | 7.9 | 5.2 | 0.0 | 4.8 | 0.0 | 0.0 | 16.6 | 18.2 | 1.692 |
| H3 | 47.5 | 13.0 | 7.9 | 5.2 | 2.4 | 2.4 | 0.0 | 0.0 | 16.6 | 17.2 | 1.694 |
| H4 | 47.5 | 13.0 | 7.9 | 5.2 | 2.4 | 0.0 | 2.4 | 0.0 | 16.6 | 20.3 | 1.699 |
| H5 | 47.5 | 13.0 | 7.9 | 5.2 | 2.4 | 0.0 | 0.0 | 2.4 | 16.6 | 23.2 | 1.691 |

*All nanocomposites have 1 wt % BYK 333 relative to the total formulation

Example 7A

A specific example, Nanocomposite H1, is a formulation with 47.5 wt % capped nanocrystals in a blend of acrylates and vinyl monomers consisting of 13.0 wt % BA, 7.9 wt % NVP, 5.2 wt % PBA, 4.8 wt % STY and 16.0 wt % NVCb and has a 21.3-cP viscosity at 25 C.

Irgacure 819 photoinitiator is added at 4 wt % (with respect to the monomer content) to the formulation, and it is deposited as a 10-micron film on a glass substrate. The film is cured under 385 nm UV at 1 J/cm2 and has a refractive index of 1.690 at 550 nm.

Another specific example, Nanocomposite H2, is a formulation with 47.5 wt % capped nanocrystals in a blend of acrylates and vinyl monomers consisting of 13.0 wt % BA, 7.9 wt % NVP, 5.2 wt % PBA, 4.8 wt % 4MS and 16.0 wt % NVCb and has an 18.2-cP viscosity at 25 C.

Irgacure 819 photoinitiator is added at 4 wt % (with respect to the monomer content) to the formulation, and it is deposited as a 10-micron film on a glass substrate. The film is cured under 385 nm UV at 1 J/cm2 and has a refractive index of 1.692 at 550 nm.

A third example, Nanocomposite H4, is a formulation with 47.5 wt % capped nanocrystals in a blend of acrylates and vinyl monomers consisting of 13.0 wt % BA, 7.9 wt % NVP, 5.2 wt % PBA, 2.4 wt % STY, 2.4% DVB and 16.0 wt % NVCb and has an 20.3-cP viscosity at 25 C.

Irgacure 819 photoinitiator is added at 4 wt % (with respect to the monomer content) to the formulation, and it is deposited as a 10-micron film on a glass substrate. The film is cured under 385 nm UV at 1 J/cm2 and has a refractive index of 1.699 at 550 nm.

Example 8

The capped TiO2 nanocrystals with average particle size of about 10 nm as measured by DLS intensity that are described above in the embodiments were dispersed via direct dispersion into desired monomers, such as BA or PBA, to desired loadings of zirconia in the formulation ranging from 35 wt %-70 wt %, BA or PBA weight percent ranging from 30-65 wt %.

A specific example includes about 10-nm capped TiO2 nanocrystals dispersed in the same manner previously described into desired monomer blends, such as BA and PBA. The compositions, viscosities, formulation RI values at 589 nm, cured film RI values at 550 nm, film thicknesses and % T at 400 and 700 nm are shown for Nanocomposites I1-I8 in Table 6.

Figure 10:
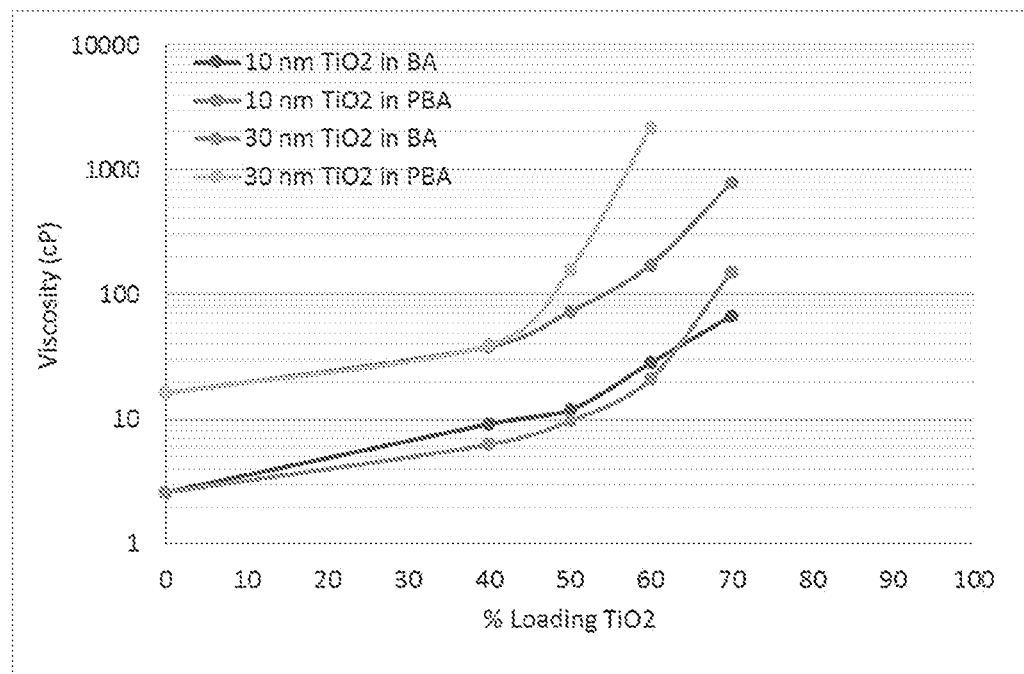
FIG. 10 shows viscosity of TiO2 nanocomposite formulations versus weight percent loading for small (10 nm) and large (30 nm) TiO2 nanoparticles in BA and PBA monomers FIG. 11 displays the liquid RI at 589 nm of TiO2 nanocomposite formulations versus weight percent loading for small (10 nm) and large (30 nm) TiO2 nanoparticles in BA and PBA monomers FIG. 12 displays the cured film RI at 589 nm of TiO2 nanocomposite formulations versus weight percent loading for small (10 nm) and large (30 nm) TiO2 nanoparticles in BA and PBA monomers
Figure 11:
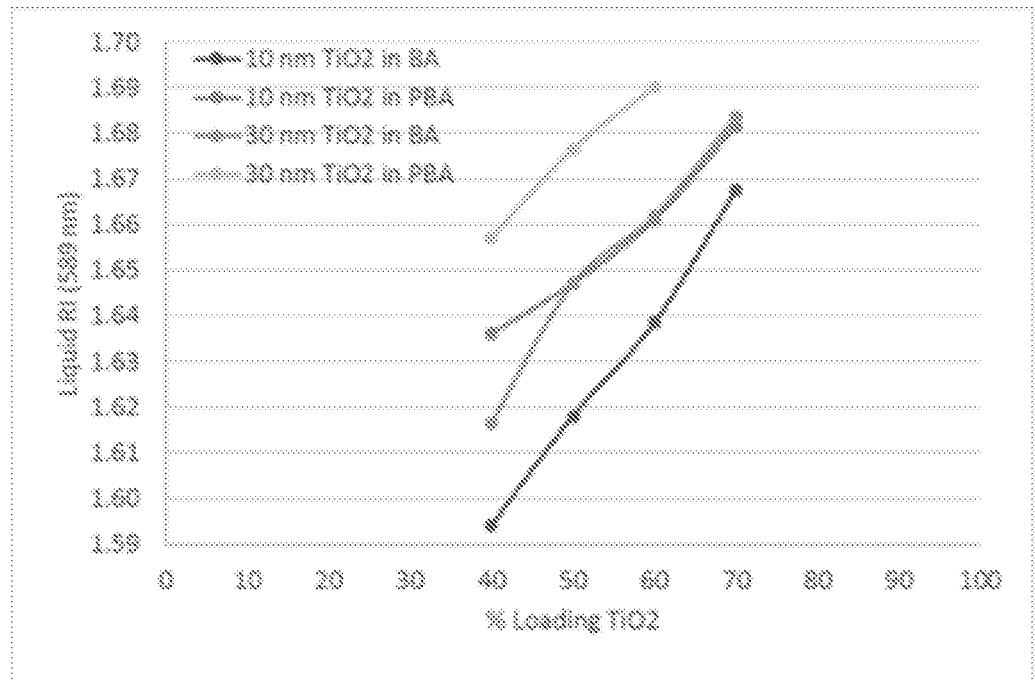
Figure 12:
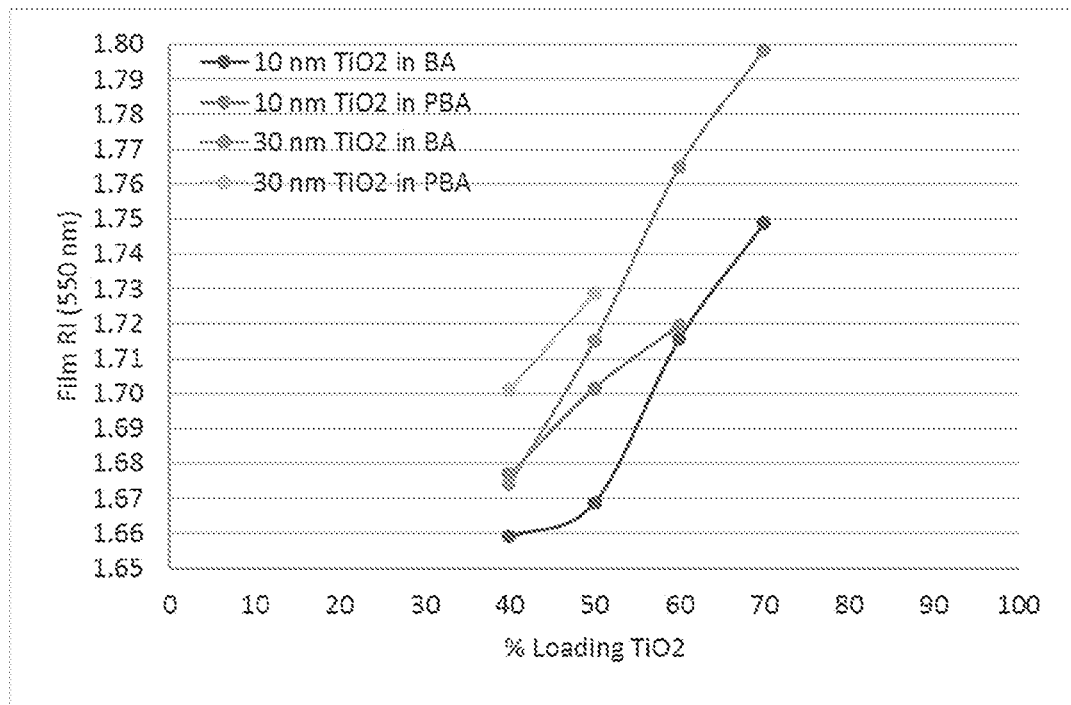
Figure 13A:
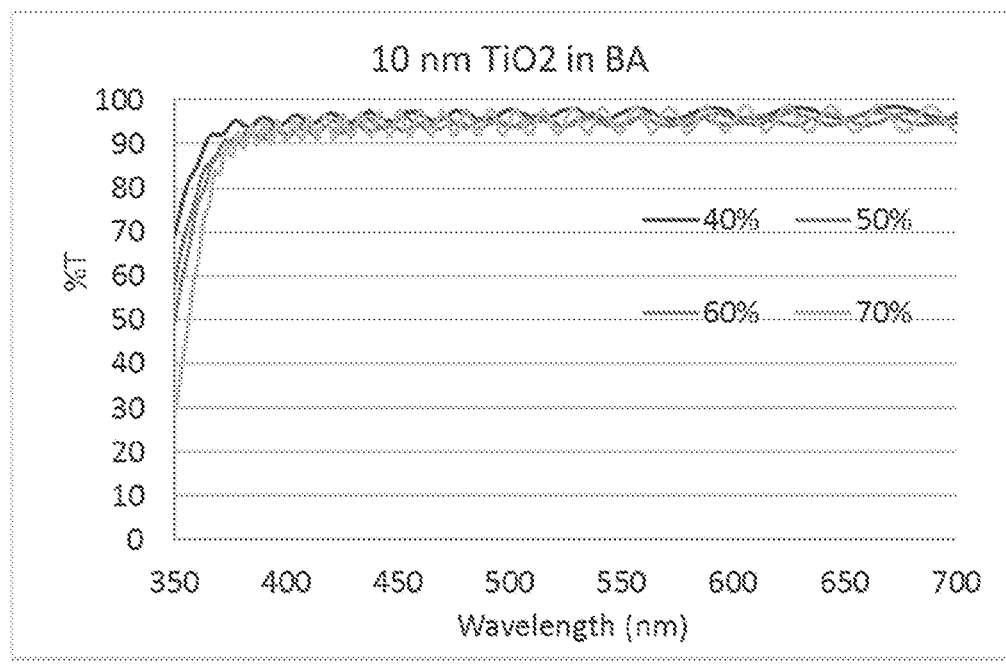
FIG. 13A shows the % T versus wavelength for 10 nm TiO2 nanocomposite BA films with thicknesses between 3.5-5.7 microns.
Figure 13B:
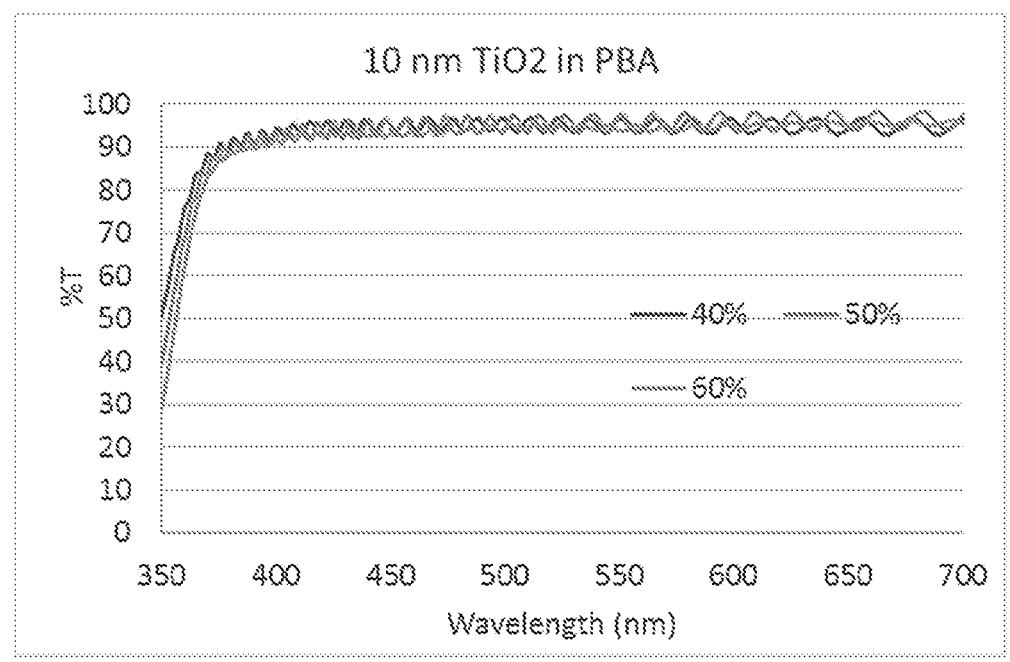
FIG. 13B shows the % T versus wavelength for 10 nm TiO2 nanocomposite PBA films with thicknesses between 5.4-6.4 microns.
Figure 14A:
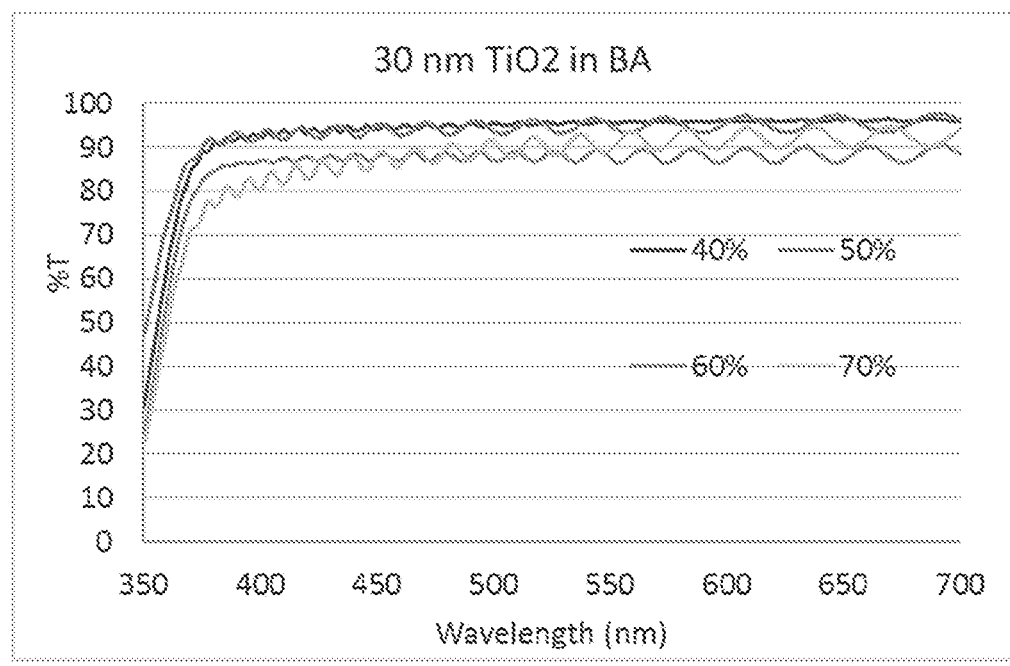
FIG. 14A shows the % T versus wavelength for 30 nm TiO2 nanocomposite BA films with thicknesses between 3.3-6.1 microns.
Figure 14B:
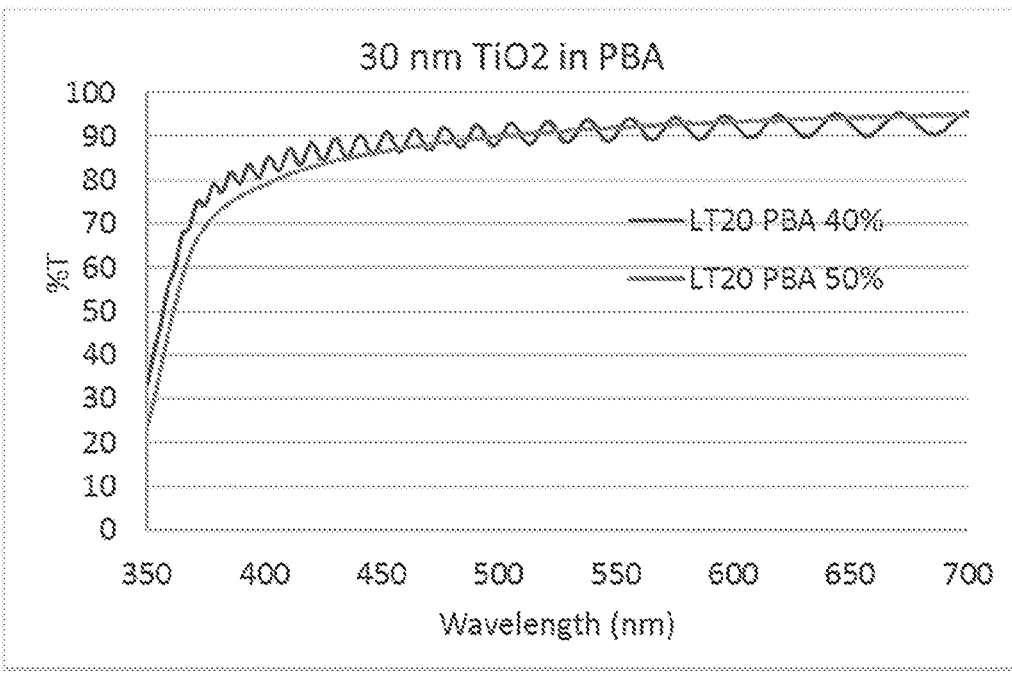
FIG. 14B shows the % T versus wavelength for around 30-nm TiO2 nanocomposite PBA films with thicknesses between 4.4-5.8 microns.

FIG. 10 shows the relationship of the nanocomposite formulation viscosity at 25 C for different weight percent loadings of about 10-nm TiO2 particles in BA and PBA monomers. For inkjet-printable formulations the preferred capped nanocrystal weight percent ranges from 40-60 wt %, BA weight percent ranges from 40-60 wt %, giving rise to viscosities close to 8-30 cP. For higher viscosity applications (30-1,000 cP), e.g. slot-die coating or nanoimprinting, higher TiO2 loadings are valid between 40-80 wt % with PBA weight percent ranging from 30-60 wt %. FIG. 11 shows the RI at 589 nm for the uncured nanocomposite formulation varies between 1.59-1.69 when the about 10-nm TiO2 is dispersed in BA and PBA monomers. The cured nanocomposite film RI values at 550 nm are shown in FIG. 12, and the values range from 1.65 to 1.75.

TABLE 6

| Nanocomposite | TiO$_2$ (wt %) | BA (wt %) | PBA (wt %) | Viscosity (cP) | Liquid RI (589 nm) | RI (550 nm) | Film Thickness (um) | % T (400 nm) | % T (700 nm) |
|---|---|---|---|---|---|---|---|---|---|
| I1 | 40 | 60 |    | 9.2 | 1.594 | 1.659 | 3.57 | 95.14 | 96.25 |
| I2 | 50 | 50 |    | 11.9 | 1.618 | 1.669 | 4.09 | 92.08 | 97.03 |
| I3 | 60 | 40 |    | 28.5 | 1.638 | 1.716 | 3.54 | 91.68 | 94.88 |
| I4 | 70 | 30 |    | 67.7 | 1.667 | 1.749 | 5.70 | 90.53 | 92.85 |
| I5 | 40 |    | 60 | 37.9 | 1.636 | 1.677 | 5.45 | 94.35 | 96.50 |
| I6 | 50 |    | 50 | 72.6 | 1.647 | 1.702 | 5.89 | 93.11 | 97.31 |
| I7 | 60 |    | 40 | 172.0 | 1.661 | 1.719 | 6.41 | 91.53 | 95.63 |
| I8 | 70 |    | 30 | 784.9 | 1.681 |  |  |  |  |

Example 9

The capped TiO2 nanocrystals with average particle size of about 30 nm as measured by DLS intensity (core size about 12-18 nm) that are described above in the embodiments were dispersed via direct dispersion into desired monomers, such as BA or PBA, to desired loadings of zirconia in the formulation ranging from 35 wt %-70 wt %, BA or PBA weight percent ranging from 30-65 wt %.

A specific example includes about 30-nm capped TiO2 nanocrystals dispersed in the same manner previously described into desired monomer blends, such as BA and PBA. The compositions, viscosities, formulation RI values at 589 nm, cured film RI values at 550 nm, film thicknesses and % T at 400 and 700 nm are shown for Nanocomposites J1-J7 in Table 7.

FIG. 10 also shows the relationship of the nanocomposite formulation viscosity at 25 C for different weight percent loadings of about 30-nm TiO2 particles in BA and PBA monomers. For inkjet-printable formulations the preferred capped nanocrystal weight percent ranges from 40-65 wt %, BA weight percent ranges from 35-60 wt %, giving rise to viscosities close to 8-30 cP. For higher viscosity applications (30-2000 cP), e.g. slot-die coating or nanoimprinting, higher TiO2 loadings are valid between 40-80 wt % with PBA weight percent ranging from 30-60 wt %. FIG. 11 also shows the RI at 589 nm for the uncured nanocomposite formulation varies between 1.61-1.69 when the about 30-nm TiO2 is dispersed in BA and PBA monomers. The cured nanocomposite film RI values at 550 nm are shown in FIG. 12, and the values range from 1.67 to 1.80.

TABLE 7

| Nanocomposite | TiO$_2$ (wt %) | BA (wt %) | PBA (wt %) | Viscosity (cP) | Liquid RI (589 nm) | RI (550 nm) | Film Thickness (um) | % T (400 nm) | % T (700 nm) |
|---|---|---|---|---|---|---|---|---|---|
| J1 | 40 | 60 | | 6.28 | 1.616 | 1.674 | 6.13 | 92.19 | 96.07 |
| J2 | 50 | 50 | | 9.68 | 1.647 | 1.715 | 3.35 | 92.92 | 96.22 |
| J3 | 60 | 40 | | 21.2 | 1.662 | 1.765 | 3.99 | 86.97 | 88.44 |
| J4 | 70 | 30 | | 152.4 | 1.683 | 1.798 | 3.49 | 80.36 | 94.11 |
| J5 | 40 | | 60 | 39.2 | 1.657 | 1.701 | 4.41 | 83.55 | 95.51 |
| J6 | 50 | | 50 | 158.6 | 1.676 | 1.729 | 5.83 | 78.91 | 94.97 |
| J7 | 60 | | 40 | 2170 | 1.690 | | | | |

Example 10

Figure 15:
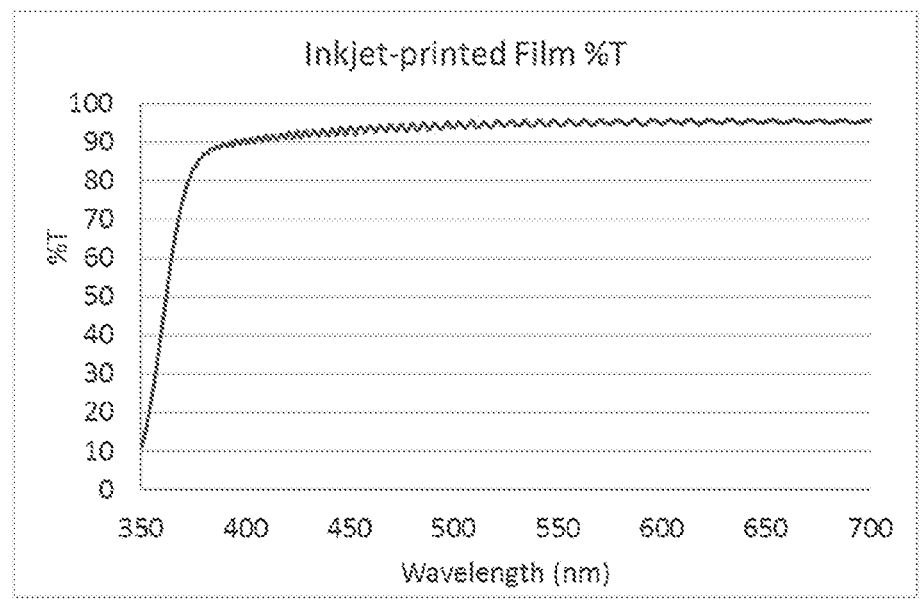
FIG. 15 has the % T of an inkjet-printed film from EXAMPLE 10 that consists of around 30 nm TiO2 and has a film thickness of 12.0 microns.

The capped TiO2 nanocrystals as described above in the embodiments were dispersed via direct dispersion into desired monomers, such as BA, NVP and PBA, to a specific loading of 45 wt % of around 30-nm TiO2 in the formulation at 27.5 wt % BA, 16.5 wt % NVP and 11 wt % PBA to illustrate an example of an inkjet-printable TiO2 ink. The 17.4-cP ink was printable using a Dimatix inkjet printer at 30 C at a voltage of 18 V with no apparent nozzle plate wetting observed. FIG. 15 shows that the % T of a 12-micron film that was inkjet-printed was greater than or equal to 90% at wavelengths above 400 nm. The film RI at 550 nm for this film was measured to be 1.683.

Example 11

The capped nanocrystals, including both ZrO2 and TiO2 both at about 10 nm particle size, were dispersed together in different ratios in the same manner previously described into desired monomers. Table 8 shows the composition, viscosity and film RI (550 nm) data of Nanocomposites K1 to K6, which contains results from mixed ZrO2 and TiO2 nanocomposites at 50 wt % loading. The ZrO2-only film (Nanocomposite B1 described in EXAMPLE 2) has the lowest RI and viscosity of 1.639 and 9.6 cP, respectively. Nanocomposite K3 (similar to Nanocomposite 12 described in EXAMPLE 8) represents the TiO2-only film for comparison, and it has a film RI and viscosity of 1.695 and 18.7 cP, respectively. Additional examples of mixed ZrO2/TiO2 nanocomposites are shown to have greater than 1.70 film RI values with selected monomers and specific ratios while maintaining viscosities less than 30 cP.

TABLE 8

| Nanocomposite | ZrO$_2$ (wt %) | TiO$_2$ (wt %) | BA (wt %) | NVP (wt %) | PBA (wt %) | STY (wt %) | NVCb (wt %) | Viscosity (cP) | RI (550 nm) |
|---|---|---|---|---|---|---|---|---|---|
| B1 | 50.0 | | 25.0 | 25.0 | | | | 9.6 | 1.639 |
| K1 | 37.5 | 12.5 | 25.0 | 25.0 | | | | 11.0 | 1.651 |
| K2 | 25.0 | 25.0 | 25.0 | 25.0 | | | | 13.3 | 1.661 |
| K3 | | 50.0 | 25.0 | 25.0 | | | | 18.7 | 1.695 |
| K4 | 35.0 | 15.0 | 12.3 | 12.2 | 6.7 | 6.0 | 12.6 | 21.0 | 1.706 |
| K5 | 20.0 | 30.0 | 13.4 | 11.9 | 6.4 | 5.7 | 12.4 | 28.3 | 1.728 |
| K6 | 25.0 | 25.0 | 13.5 | 12.0 | 6.5 | 5.5 | 12.5 | 23.4 | 1.724 |

Example 12

The capped nanocrystals, both ZrO2 and TiO2, were separately dispersed in the same manner previously described in PGMEA into desired sulfur-containing commercial resins by NTT-AT. The $TiO_2$ in Nanocomposites L4 to L6 are around 30 nm particle size. Table 9 displays the composition and film RI (550 nm) data of Nanocomposites L1 to L6, which compares results from $ZrO_2$ and $TiO_2$ nanocrystals. Nanocomposites L4 to L6 have noticeably high film RI values that are greater than 1.82.

TABLE 9

| Nanocomposite | $ZrO_2$ (wt %) | $TiO_2$ (wt %) | #18109 (wt %) | #18165 (wt %) | #6205 (wt %) | RI (550 nm) |
|---|---|---|---|---|---|---|
| L1 | 65 | | 35 | | | 1.743 |
| L2 | 65 | | | 35 | | 1.770 |
| L3 | 65 | | | | 35 | 1.776 |
| L4 | | 65 | 35 | | | 1.842 |
| L5 | | 65 | | 35 | | 1.880 |
| L6 | | 65 | | | 35 | 1.822 |

Example 13

The capped nanocrystals, both ZrO2 and TiO2, were separately dispersed in the same manner previously described in PGMEA into desired sulfur-containing commercial LumipluS® resins by Mitshubishi Gas Chemical Company. The TiO2 in Nanocomposites L4 to L6 are around 10 nm particle size. Table 10 shows the composition and film RI (550 nm) data of Nanocomposites M1 to M10, which compares results from ZrO2 and TiO2. Nanocomposites M7 and M8 particularly emphasize examples that have film RI values greater than 1.90.

TABLE 10

| Nanocomposite | $ZrO_2$ (wt %) | $TiO_2$ (wt %) | LP-1100 (wt %) | LPB-1102 (wt %) | LPJ-1102 (wt %) | LPS-1130 (wt %) | RI (550 nm) |
|---|---|---|---|---|---|---|---|
| M1 | 50 | | 50 | | | | 1.760 |
| M2 | 50 | | | | | 50 | 1.719 |
| M3 | 65 | 35 | | | | | 1.765 |
| M4 | 65 | | | | | 35 | 1.735 |
| M5 | 80 | 20 | | | | | 1.769 |
| M6 | 80 | | | | | 20 | 1.754 |
| M7 | | 65 | 35 | | | | 1.914 |
| M8 | | 65 | | 35 | | | 1.909 |
| M9 | | 65 | | | 35 | | 1.859 |
| M10 | | 65 | | | | 35 | 1.862 |

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

With respect to aspects of the invention described as a genus, all individual species are individually considered separate aspects of the invention. If aspects of the invention are described as "comprising" a feature, embodiments also are contemplated "consisting of" or "consisting essentially of" the feature.

As used herein, the term "about" modifying an amount related to the invention refers to variation in the numerical quantity that can occur, for example, through routine testing and handling; through inadvertent error in such testing and handling; through differences in the manufacture, source, or purity of ingredients employed in the invention; and the like. As used herein, "about" a specific value also includes the specific value, for example, about 10% includes 10%. Whether or not modified by the term "about", the claims include equivalents of the recited quantities. In one embodiment, the term "about" means within 20% of the reported numerical value.

Where possible, any terms expressed in the singular form herein includes the plural form of the term and/or vice versa, unless the context clearly indicates otherwise.

It is understood that wherever embodiments are described herein with the language "comprising" otherwise analogous embodiments described in terms of "consisting of" and/or "consisting essentially of" are also provided. However, when used in the claims as transitional phrases, each should be interpreted separately and in the appropriate legal and factual context (e.g., "comprising" is considered more of an open-ended phrase while "consisting of" is more exclusive and "consisting essentially of" achieves a middle ground).

The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

All of the various aspects, embodiments, and options described herein can be combined in any and all variations.

The content of each of the following applications is incorporated herein by reference in its entirety: 1) U.S. provisional application No. 62/769,703 filed Nov. 20, 2018; 2) U.S. provisional application No. 62/892,625, filed Aug. 28, 2019; and 3) International Application No. PCT/US2019/062439, filed Nov. 20, 2019, entitled "SYNTHESIS, CAPPING, AND DISPERSION OF TiO2 NANOCRYSTALS," which claims priority to U.S. provisional application Nos. 62/769,703 and 62/892,625.

In some embodiments, the present disclosure can also exclude any of the embodiments described in U.S. Provisional Application No. 62/892,630, filed Aug. 28, 2019.

All publications, patents, and patent applications mentioned in this specification are herein incorporated by reference to the same extent as if each individual publication, patent, or patent application was specifically and individually indicated to be incorporated by reference. To the extent that any meaning or definition of a term in this document conflicts with any meaning or definition of the same term in a document incorporated by reference, the meaning or definition assigned to that term in this document shall govern.

What is claimed is:

1. A formulation comprising at least partially capped metal oxide nanocrystals dispersed in a matrix, wherein the metal oxide is at least one oxide selected from zirconium oxide, titanium oxide, hafnium oxide, zinc oxide, tantalum oxide, and niobium oxide, wherein:
   a) the formulation comprises less than 5 wt % solvent;
   b) the matrix comprises acrylate and/or methacrylate monomers;
   c) the formulation does not comprise benzyl methacrylate or trimethylolpropane triacrylate;
   d) the viscosity of the formulation is within the range of 5-100 cP, when measured at 25° C. with a Brookfield RVDV II+ cone and plate viscometer;
   e) the formulation has a weight loading of the metal oxide nanocrystals ranging from 20 wt % to 80 wt % of the formulation; and
   e) the formulation comprises a monofunctional acrylate and/or methacrylate monomer with high refractive index, wherein the monofunctional acrylate and/or methacrylate monomer comprises benzyl acrylate, ethylene glycol phenyl ether acrylate, ethylene glycol phenyl ether methacrylate, 2-hydroxy-3-phenoxypropyl acrylate, 2-hydroxy-3-phenoxypropyl methacrylate, 2-phenoxy benzyl acrylate, biphenyl methacrylate, 2-phenylphenol methacrylate, isobutyl acrylate, 2-phenylethyl acrylate, 2-(phenylthio) ethyl acrylate, or a combination thereof.

2. The formulation of claim 1, further comprising one or more agents independently selected from a curing agent, a surfactant, a wetting agent, an antioxidant, an adhesion promoter, a leveling agent, a dispersing agent, a plasticizer, a toughener, a thickener, a thinner, a dispersant, a flexibilizer, an organic dopant, and other functional additives.

3. The formulation of claim 1, wherein the matrix comprises one or more agents independently selected from reactive diluents and curing agents.

4. The formulation of claim 1, wherein the average particle diameter of the at least partially capped nanocrystals is in the range from 1-40 nm, as measured by DLS or TEM.

5. The formulation of claim 1, wherein said nanocrystals are at least partially capped with at least one capping agent selected from the group consisting of methyltrimethoxysilane, n-propyltrimethoxysilane, n-propyltriethoxysilane, n octyltrimethoxysilane, n-octyltriethoxysilane, phenytrimethoxysilane, dodecyltrimethoxysilane, m,p-ethylphenethyl trimethoxysilane, 2-[methoxy (polyethyleneoxy) propyl] trimethoxysilane, methoxy (triethyleneoxy) propyltrimethoxysilane, 3-aminopropyltrimethoxysilane, 3-mercaptopropyltrimethoxysilane, 3-(methacryloyloxy) propyl trimethoxysilane, 3-(acryloyloxy) propyl trimethoxysilane, 3-isocyanatopropyltriethoxysilane, 3-isocyanatopropyltrimethoxysilane, glycidoxypropyltrimethoxysilane, vinyltrimethoxysilane, allyltrimethoxysilane, 1-hexenyltrimethoxysilane, 1-octenyltrimethoxysilane, heptanol, hexanol, octanol, benzyl alcohol, phenol, ethanol, propanol, butanol, oleylalcohol, dodecylalcohol, octadecanol, triethylene glycol monomethyl ether, octanoic acid, acetic acid, propionic acid, 2-[2-(2-methoxyethoxy) ethoxy] acetic acid, oleic acid, benzoic acid, stearic acid, trifluoroacetic acid, biphenyl-4-carboxylic acid, 2-(2-methoxyethoxy) acetic acid, methacrylic acid, mono-2-(Methacryloyloxy) ethyl succinate, and combinations thereof.

6. The formulation of claim 1, wherein the formulation comprises a di-, tri-, tetra-, or penta-functional acrylate or di-, tri-, tetra-, or penta-functional methacrylate monomer comprising 1,6-hexanediol diacrylate, 1,6-hexanediol dimethacrylate, di(ethyleneglycol) diacrylate, di(ethyleneglycol) di-methacrylate, ethylene glycol diacrylate, glycerol 1,3-diglycerolate diacrylate, tri (propylene glycol) diacrylate, trimethylolpropane tri methacrylate, trimethylolpropane ethoxylate triacrylate, trimethylolpropane ethoxylate tri-methacrylate, 1,6-hexanediol ethoxylate diacrylate, pentaerythritol tetraacrylate, dipentaerythritol penta-/hexa-acrylate, or a combination thereof.

7. The formulation of claim 1, wherein the formulation further comprises a reactive diluent selected from 1-vinyl-2-pyrrolidone, N-vinyl caprolactam, 2-(2-vinyloxyethoxy) ethyl acrylate, 2-(2-vinyloxyethoxy) ethyl methacrylate, isobutyl acrylate, styrene, 4-methylstyrene, 4-vinylanisole, and divinylbenzene, wherein the weight percent of the reactive diluent is 25-70 wt % with respect to the total monomer content.

8. The formulation of claim 1, wherein the formulation further comprises a di-, tri-, or tetra-functional thiol crosslinker, or a combination thereof.

9. The formulation of claim 1, wherein the formulation further comprises a sulfur-containing resin and/or adhesive.

10. The formulation of claim 1, wherein the formulation further comprises a reactive organic dopant, in the concentration range from 1 to 50 wt %.

11. The formulation of claim 1, wherein the formulation further comprises a surfactant comprising a polyether-modified siloxane, a fluoro-surfactant, or a combination thereof, wherein the surfactant is either non-reactive or reactive in the acrylate monomer system, wherein the concentration of said surfactant within the total formulation is in the range from 0.1-2.0 wt %.

12. The formulation of claim 1, wherein the formulation further comprises scattering particles comprising titanium dioxide, aluminum oxide, silicon dioxide, low- or high-index polymer particles, or a combination thereof, wherein the scattering particle sizes range from 100-400 nm, wherein the concentration of said scattering particles within the total formulation ranges from 0.1-30.0 wt %.

13. The formulation of claim 1, further comprising a curing agent or photoinitiator, wherein the concentration of said curing agent or photoinitiator within the total formulation is in the range from 0.1-20 wt % with respect to the monomer content.

14. The formulation of claim 1, wherein the formulation has a nanocrystal loading of 35-60% by weight.

15. The formulation of claim 1, wherein the refractive index of the formulation is 1.52-1.94 at 589 nm as measured by an Abbe refractometer.

16. The formulation of claim 1, wherein the surface tension of the formulation is within the range of 20-40 dyne/cm, when measured at 25° C. with a Rame-Hart surface tensiometer.

17. The formulation of claim 1, wherein the % Transmittance of the formulation is 99%-10% in the visible wavelengths of 400-700 nm.

18. The formulation of claim 1, which is inkjet-printable, wherein droplets of the formulation can be ejected from printhead types, with droplet volumes between 6-40 pL at drop velocities from 3-9 m/s.

19. A nanocomposite film prepared from a process comprising applying the formulation of claim 1 via spin coating, slot-die coating, screen-printing, ink-jet printing, nanoimprinting, photopatterning, 3D printing, dip coating, draw-bar coating, roll-to-roll printing, spray coating, dispensing, volume casting, screen printing, or any combination thereof, to a surface, and curing the applied formulation.

20. The nanocomposite film of claim 19, wherein the curing is conducted via UV irradiation under a UV LED source with a wavelength at 365 nm, 385 nm, 395 nm, or 405 nm or via a mercury "D", "H" and/or "V" lamp(s) at a UV dose ranging from 0.1-10 J/cm2.

21. The nanocomposite film of claim 20, having a thickness ranging from 50 nanometers to 100 micrometers, or from 0.5 micrometer to 20 micrometers.

22. The nanocomposite film of claim 19, wherein the % Transmittance of the nanocomposite film at thicknesses less than 10 microns is 99%-10% in a visible wavelength from 400 nm-700 nm.

23. The nanocomposite film of claim 19, which has a refractive index of 1.54-2.00 at 550 nm.

* * * * *